US010756906B2

(12) United States Patent
Toth

(10) Patent No.: US 10,756,906 B2
(45) Date of Patent: Aug. 25, 2020

(54) ARCHITECTURE AND METHODS FOR SELF-SOVEREIGN DIGITAL IDENTITY

(71) Applicant: Kalman Csaba Toth, Portland, OR (US)

(72) Inventor: Kalman Csaba Toth, Portland, OR (US)

( * ) Notice: Subject to any disclaimer, the term of this patent is extended or adjusted under 35 U.S.C. 154(b) by 0 days.

(21) Appl. No.: 16/188,117

(22) Filed: Nov. 12, 2018

(65) Prior Publication Data

US 2019/0097812 A1 Mar. 28, 2019

Related U.S. Application Data

(63) Continuation-in-part of application No. 15/898,617, filed on Feb. 18, 2018, now Pat. No. 10,127,378, (Continued)

(51) Int. Cl.
*H04L 9/32* (2006.01)
*G06F 21/60* (2013.01)
(Continued)

(52) U.S. Cl.
CPC ............ *H04L 9/3247* (2013.01); *G06F 21/33* (2013.01); *G06F 21/602* (2013.01);
(Continued)

(58) Field of Classification Search
CPC ... H04L 9/3247; H04L 63/0884; G06F 21/33; G06F 21/31
(Continued)

(56) References Cited

U.S. PATENT DOCUMENTS 5,948,103 A  9/1999 Fukuzaki
6,401,206 B1  6/2002 Khan
(Continued)

FOREIGN PATENT DOCUMENTS

EP  1130491  10/2006
EP  1470534  10/2006
(Continued)

OTHER PUBLICATIONS

Kiara Robles, BlockchainMe, a tool for creating verifiable IDs on the blockchain, Dec. 2, 2016.
(Continued)

*Primary Examiner* — Bryan F Wright
(74) *Attorney, Agent, or Firm* — J. Curtis Edmundson; Law Offices of J. Curtis Edmundson

(57) ABSTRACT

An architecture and methods for self-sovereign digital identity is described. The method mimics the handling of identities in the physical world, by provisioning unique digital identities to people. Digital identities and consent tokens are said to be self-sovereign because they are tightly controlled by their owners using identity engines installed on personal devices. Identity engines are interoperable, establishing a web identity layer. Self-sovereign digital identities are used to identify their holders, sign and encrypt transactions, and create digital seals that cannot be repudiated. Digital seals affix the identities and attestations of collaborating parties to digital identities, consent tokens, transactions, documents, and other artifacts. Self-sovereign digital identities can be exchanged securely, verified using proof-of-possession and proof-of-custody tests when collaborating synchronously, and verified using a proof-of-existence identity registry when collaborating asynchronously.

3 Claims, 20 Drawing Sheets

Usage Scenario: Issuing an Original E-Credential

Related U.S. Application Data which is a continuation-in-part of application No. 14/503,797, filed on Oct. 1, 2014, now Pat. No. 9,646,150.

(60) Provisional application No. 62/742,895, filed on Oct. 8, 2018, provisional application No. 62/743,350, filed on Oct. 9, 2018, provisional application No. 62/575,301, filed on Oct. 20, 2017, provisional application No. 61/885,251, filed on Oct. 1, 2013.

(51) Int. Cl.

| | |
|---|---|
| G06F 21/62 | (2013.01) |
| H04L 9/30 | (2006.01) |
| H04L 9/08 | (2006.01) |
| H04L 9/14 | (2006.01) |
| H04W 12/12 | (2009.01) |
| H04L 9/06 | (2006.01) |
| H04W 12/06 | (2009.01) |
| H04L 9/00 | (2006.01) |
| G06F 21/33 | (2013.01) |

(52) U.S. Cl.
CPC .......... *G06F 21/6245* (2013.01); *H04L 9/006* (2013.01); *H04L 9/0643* (2013.01); *H04L 9/0841* (2013.01); *H04L 9/0894* (2013.01); *H04L 9/14* (2013.01); *H04L 9/3013* (2013.01); *H04L 9/3213* (2013.01); *H04L 9/3218* (2013.01); *H04L 9/3242* (2013.01); *H04L 9/3271* (2013.01); *H04L 9/3273* (2013.01); *H04W 12/0608* (2019.01); *H04W 12/1206* (2019.01)

(58) Field of Classification Search
USPC .......................................................... 726/6
See application file for complete search history.

(56) References Cited

U.S. PATENT DOCUMENTS

| | | | |
|---|---|---|---|
| 7,310,734 B2 | 12/2007 | Boate et al. | |
| 7,565,540 B2 | 7/2009 | Bogasky | |
| 7,660,988 B2 | 2/2010 | Carmichael et al. | |
| 8,019,691 B2 | 9/2011 | Dominigueaz et al. | |
| 8,127,228 B2 | 2/2012 | Cheng et al. | |
| 8,200,975 B2 | 6/2012 | O'Connor | |
| 8,694,788 B1 | 4/2014 | Thomas | |
| 9,166,986 B1 | 10/2015 | Saylor | |
| 9,444,805 B1* | 9/2016 | Saylor | H04W 4/029 |
| 9,516,018 B1* | 12/2016 | Vazquez | H04L 63/0853 |
| 9,646,150 B2 | 5/2017 | Toth | |
| 9,866,393 B1* | 1/2018 | Rush | H04L 9/3247 |
| 9,900,309 B2 | 2/2018 | Toth | |
| 10,127,378 B2 | 11/2018 | Toth | |
| 2002/0026577 A1 | 2/2002 | Futamura | |
| 2002/0046352 A1* | 4/2002 | Ludwig | H04L 63/0884 726/12 |
| 2003/0120611 A1 | 6/2003 | Yoshino | |
| 2003/0163686 A1 | 8/2003 | Ward | |
| 2003/0177361 A1 | 9/2003 | Wheeler | |
| 2005/0125666 A1 | 6/2005 | Lin | |
| 2005/0188204 A1 | 8/2005 | Rice | |
| 2005/0257045 A1 | 11/2005 | Bushman | |
| 2006/0282662 A1* | 12/2006 | Whitcomb | G06F 21/33 713/156 |
| 2007/0101434 A1 | 5/2007 | Jevans | |
| 2007/0118732 A1 | 5/2007 | Whitmore | |
| 2007/0235517 A1 | 10/2007 | O'Connor | |
| 2008/0046758 A1 | 2/2008 | Cha | |
| 2008/0224823 A1 | 9/2008 | Lawson | |
| 2008/0248779 A1 | 10/2008 | Tsui | |
| 2009/0031135 A1 | 1/2009 | Kothandaraman | |
| 2009/0132813 A1 | 5/2009 | Schibuk | |
| 2009/0158032 A1 | 6/2009 | Costa | |
| 2010/0100465 A1* | 4/2010 | Cooke | H04L 9/3297 705/34 |
| 2010/0191830 A1 | 7/2010 | Kim | |
| 2011/0085474 A1 | 4/2011 | Honjo | |
| 2013/0030989 A1* | 1/2013 | Geller | G06Q 30/018 705/39 |
| 2014/0035720 A1 | 2/2014 | Chapman | |
| 2014/0165151 A1 | 6/2014 | Welday, Jr. | |
| 2014/0331282 A1* | 11/2014 | Tkachev | G06F 21/31 726/3 |
| 2018/0293373 A1* | 10/2018 | Johnson | G06F 21/31 |
| 2019/0266576 A1* | 8/2019 | McCauley | G06Q 20/40145 |

FOREIGN PATENT DOCUMENTS

| | | |
|---|---|---|
| EP | 2460307 | 6/2012 |
| WO | WO-2002020542 | 3/2005 |

OTHER PUBLICATIONS

K C. Toth and A A. Priddy, Architecture for Self-Sovereign Digital Identity, Computer Applications for Industry and Engineering (CAINE), New Orleans, LA, USA. Oct. 8-10, 2018.
Kim Cameron, "The Laws of Identity". May 2005 http://myinstantid.com/laws.pdf.
Joy Macnight, The Banker.com, "Will the digital world solve the identity Crisis?", Jan. 2, 2018.
World Economic Forum, "A Blueprint for Digital Identity", Aug. 2016.
Nir Kshetri, "An Opinion on the Report on Securing and Growing the Digital Economy" IEEE Security & Privacy, vol. 15, No. 1 Jan./Feb. 2017, pp. 80-85.
Christopher Allen, "The Path to Self-Sovereign Identity", Apr. 27, 2016, http://www.coindesk.com.
Christian Lunvist, ROuven Heck, Joel Tortensson, Zac Mitton Sena, UPORT: A Platform for Self-Sovereign Identity: Feb. 21, 2017.
Dirk Balfanz, Glenn Durfee, Rebecca E. Gritner, D.K. Smetters, In Search of Usable Security:Five Lessons from the Field, IEEE Security & Privacy vol. 2 No. 5 Sep. 2004 pp. 19.
Garfinkel, Simson, PGP: Pretty Good Privact. O'Reilly & Assocaites, Dec. 1, 1991, ISBN 1-56592-098-8.
N. Ashokan, Baltteri Niemi, PEkka Laitinene, "On the Usefulness of Proof of Possession", 2nd annual PKI Workshop, Apr. 28-29, 2013.
IBM, "Re-Thinking the World of Identity", Mar. 21, 2017, https://www.ibm.com/blogs/think/2017/03/transforming-the-world-of digital-identity/.
FIPS Pub 201-2, Federal Information Processing Standards Publication, Personal Identity Verififcation (PIV) of Federal Empolyees and Contractors.
RSA Laboratories, B. Kaliski PKCS# 5: Password Based Cryptography Specification, Version 2.0, Sep. 2000.
PKCS 12, v1.0: Personal Information Exchange Syntax, RSA Laboratories, Jun. 24, 1999.
Finney, H et al., Internet Engineering Taskforcce (IETF), Open PGP Message Format, Network Working Group , Nov. 2007.
Ma, L., Tan, T., Wang, Y., and Zhang, D., "Efficient Iris Recognition by characterizing key local variations" IEEE Trans. Image Processing 13.6 (2004).
Gary Blair, SMS-Delivered two Factor authentication will be dead in three years, 2007.
Paul Madsen (Editor), Liberty Alliance Project White paper, Liberty ID-WSF People Service Dec. 5, 2005.
South China Morning Post, We chat poised to become China's Official Electronic ID System, Published Dec. 26, 2017.
BBC, India Aadhar ID cards: Collecting Biometric data from One Billion People , Jun. 23, 2017.

(56) References Cited

OTHER PUBLICATIONS

Dick Hardt, User-Centric Identity, Open ID Foundation Presentation, Dec. 2010, http://dickhardt.org/2010/12/oidf-2010/index.html#more-85.

* cited by examiner

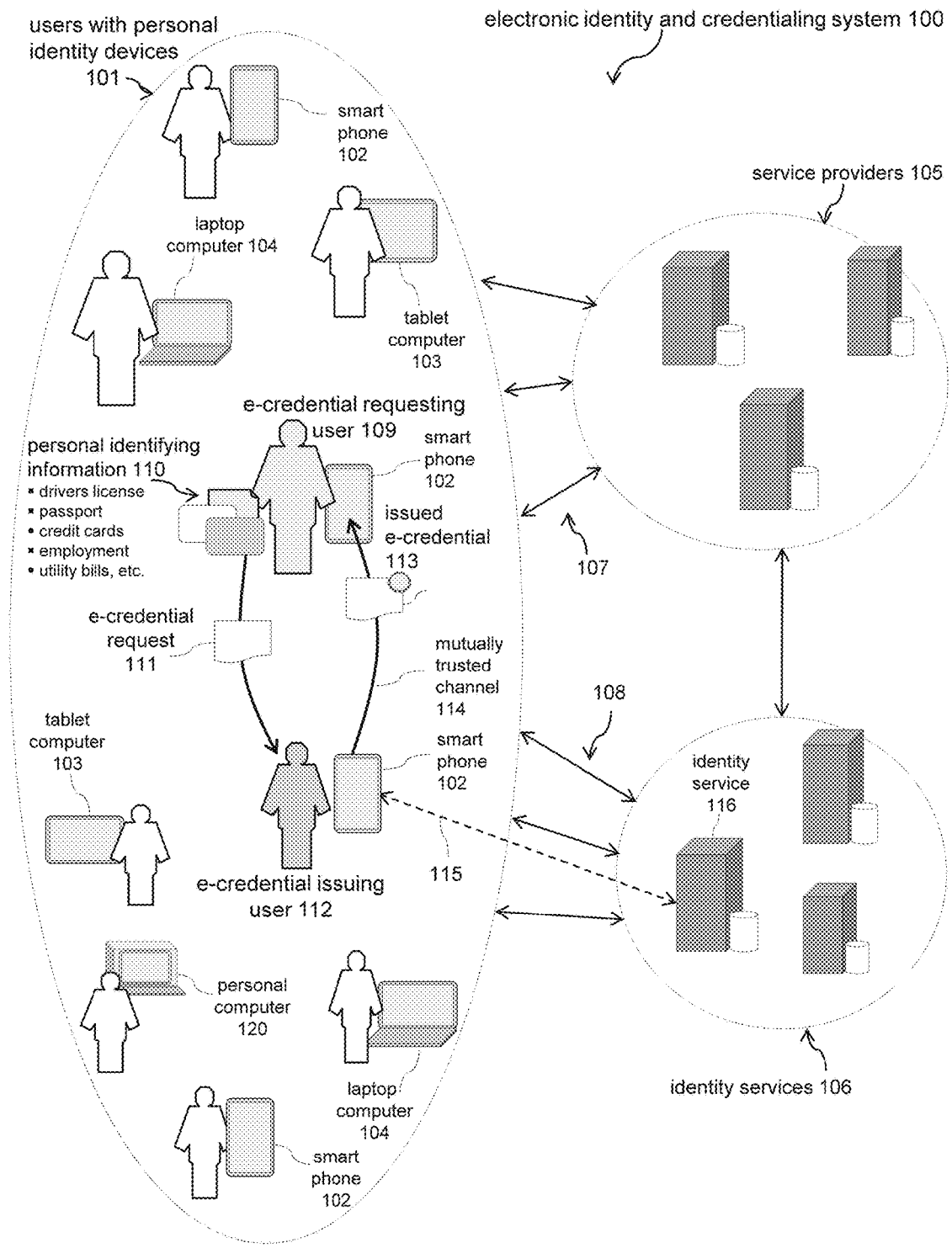
Figure 1 Depicting Scope of Electronic Identity and Credentialing System

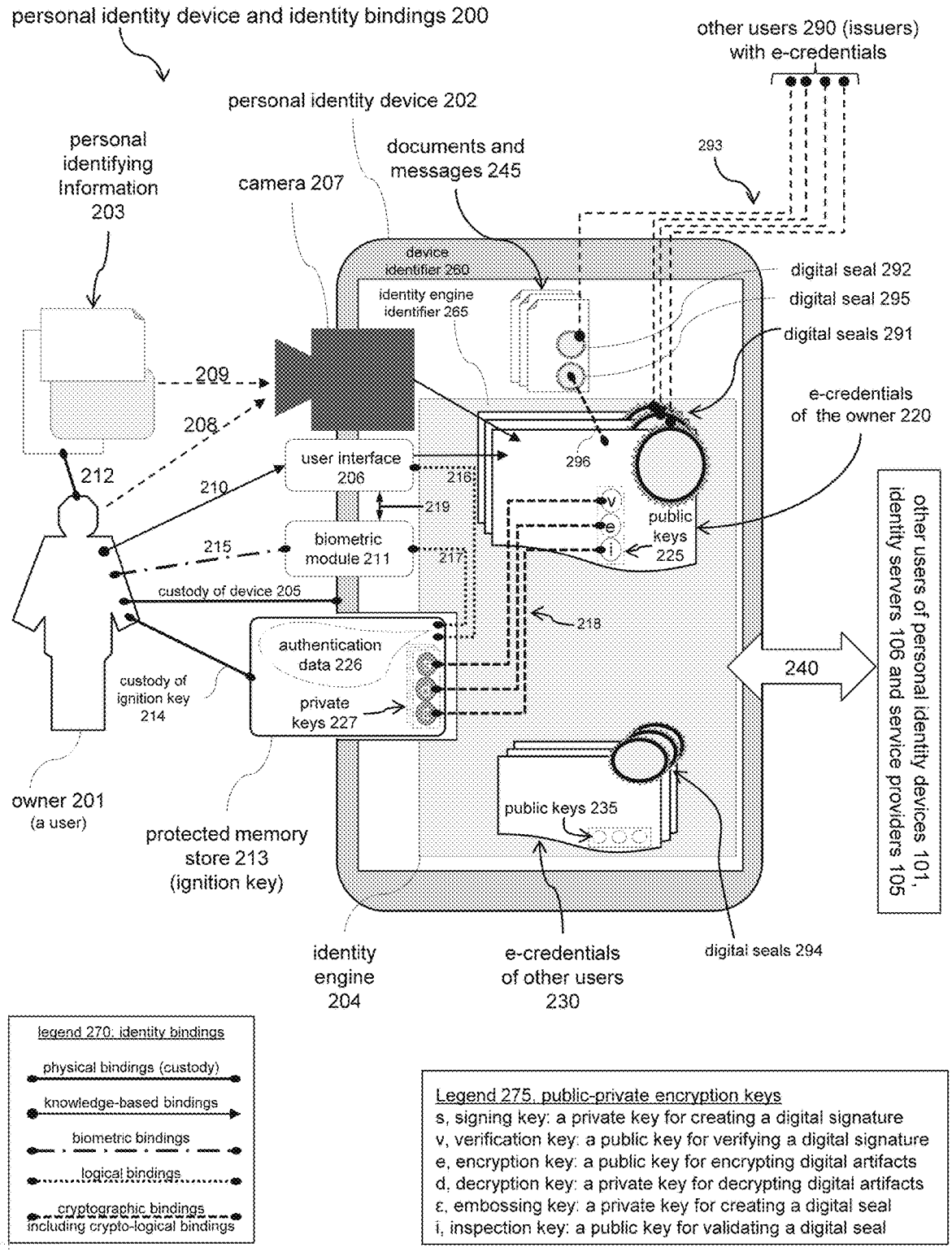
Figure 2 Depicting Personal Identity Device and Identity Bindings

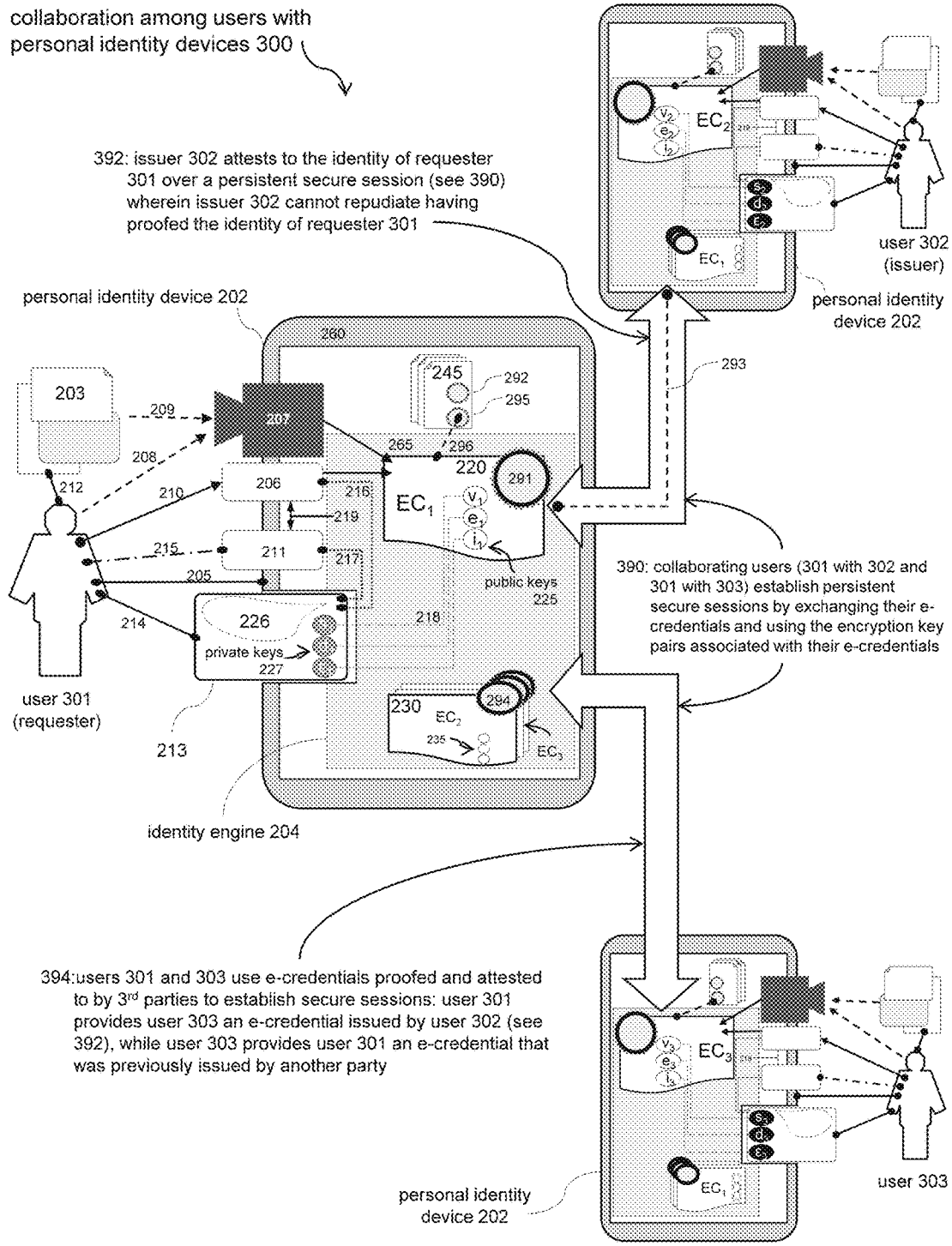
Figure 3 Depicting Collaboration Among Users with Personal Identity Devices

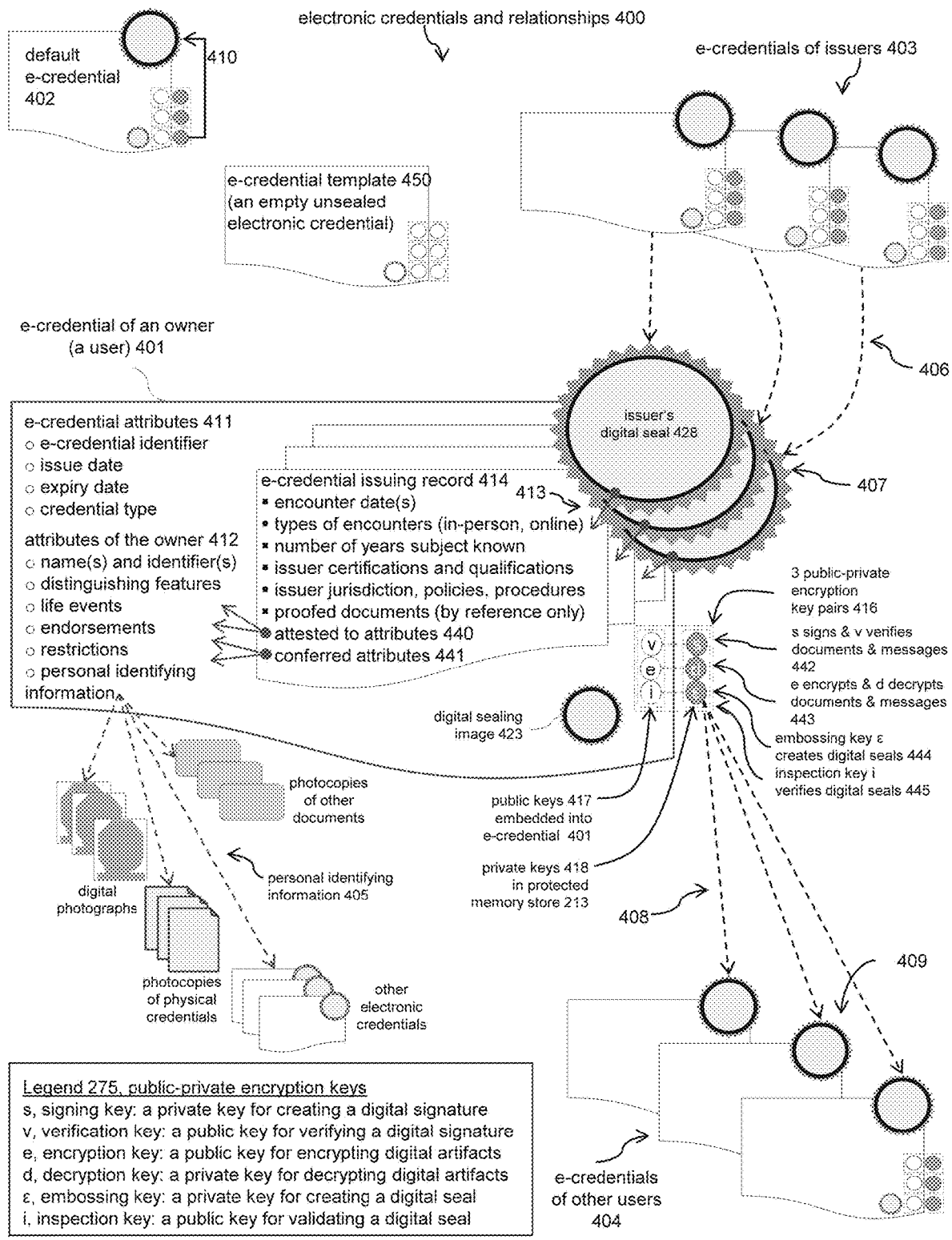
Figure 4 Depicting Electronic Credentials and Relationships

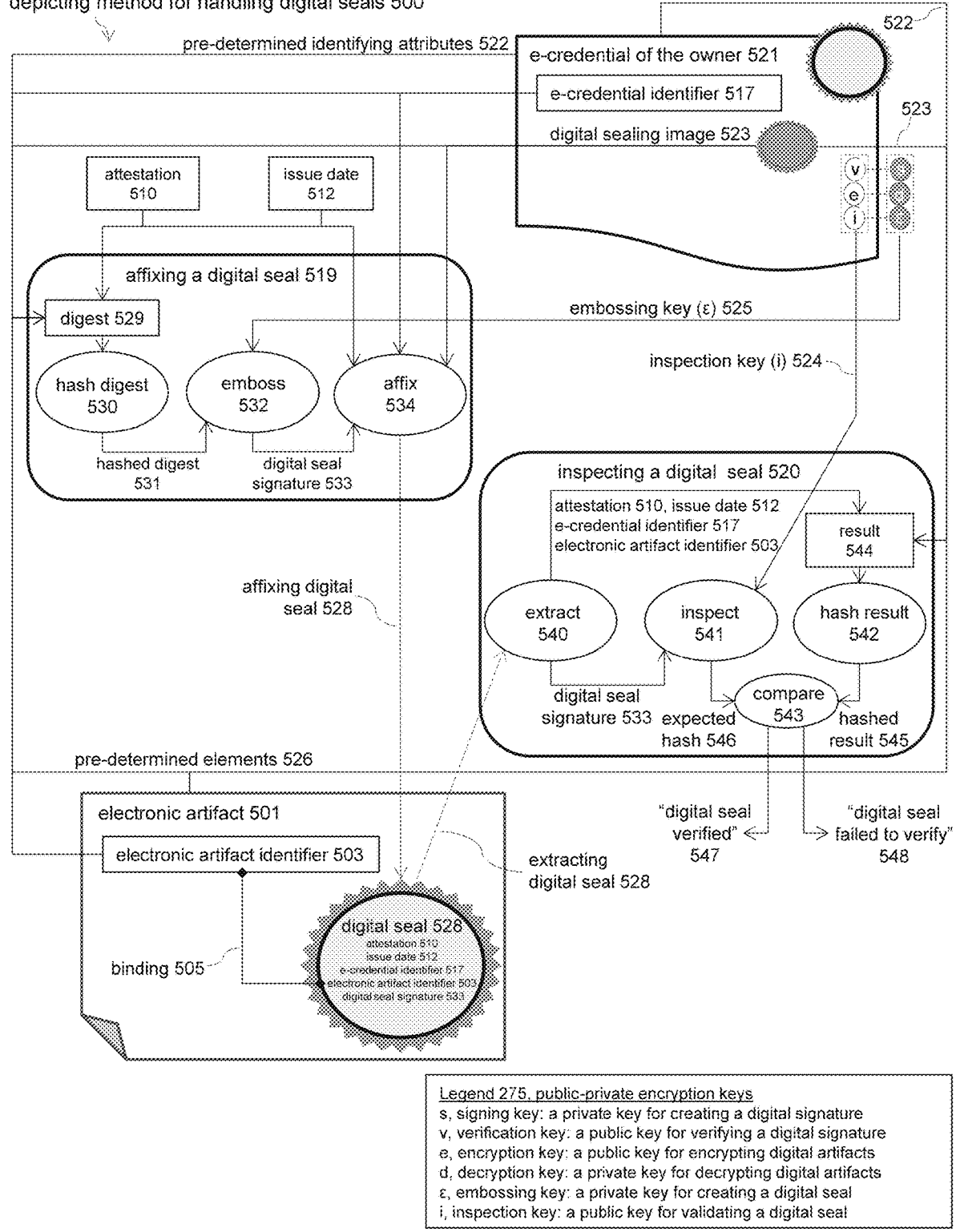
Figure 5 Depicting Method for Handling Digital Seals

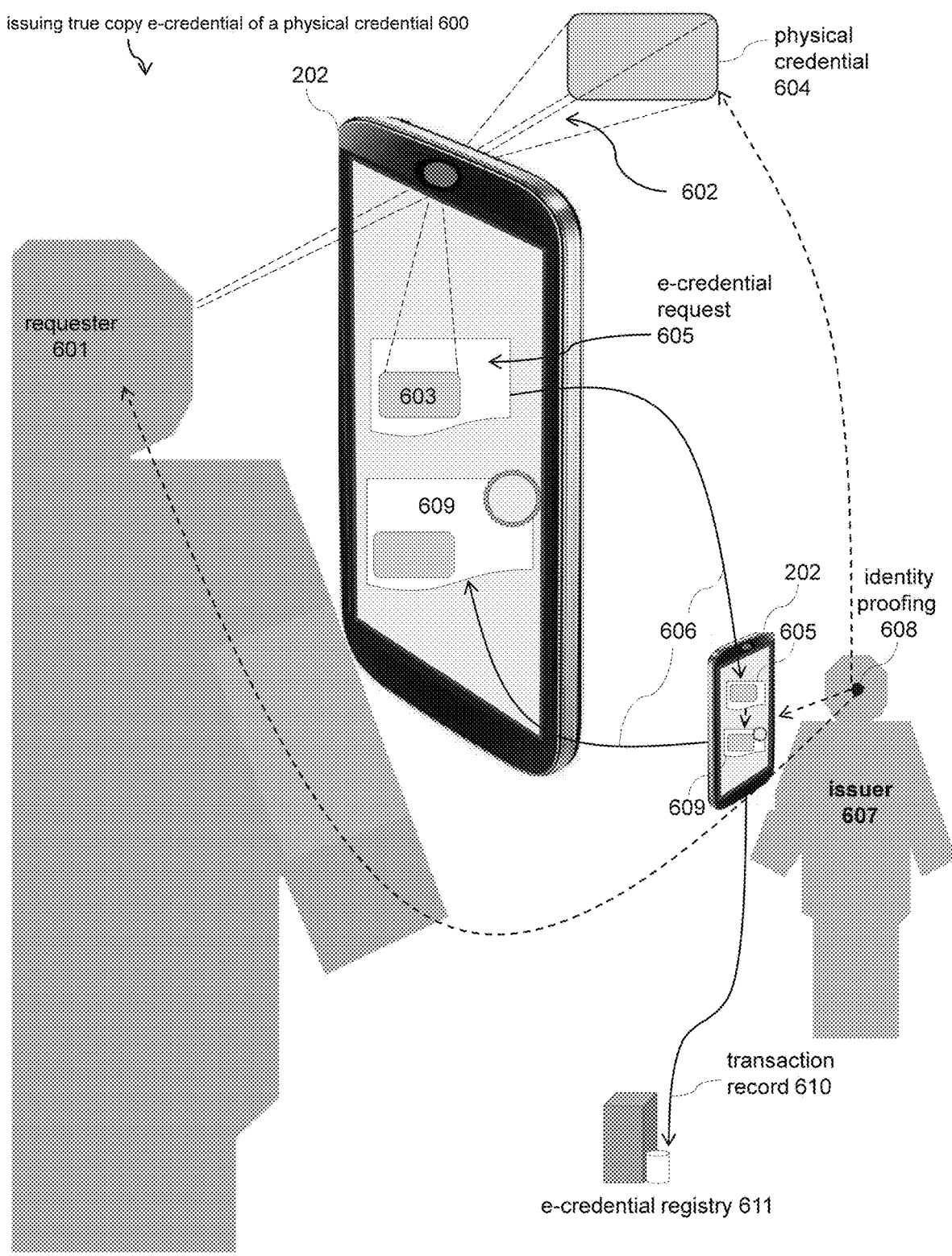
Figure 6 Usage Scenario: Issuing True Copy of a Physical Credential

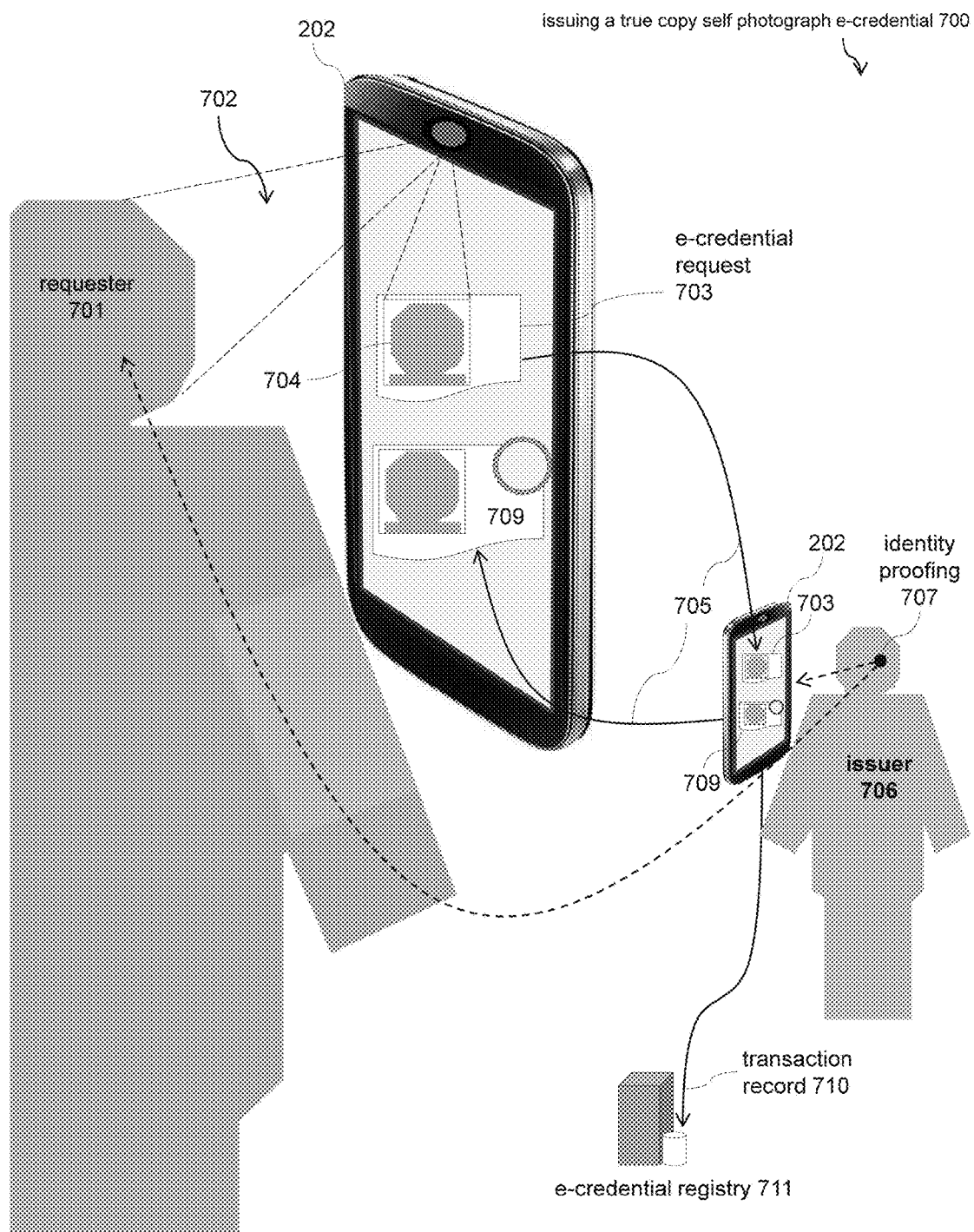
Figure 7 Usage Scenario: Issuing True Copy Self Photograph E-Credential

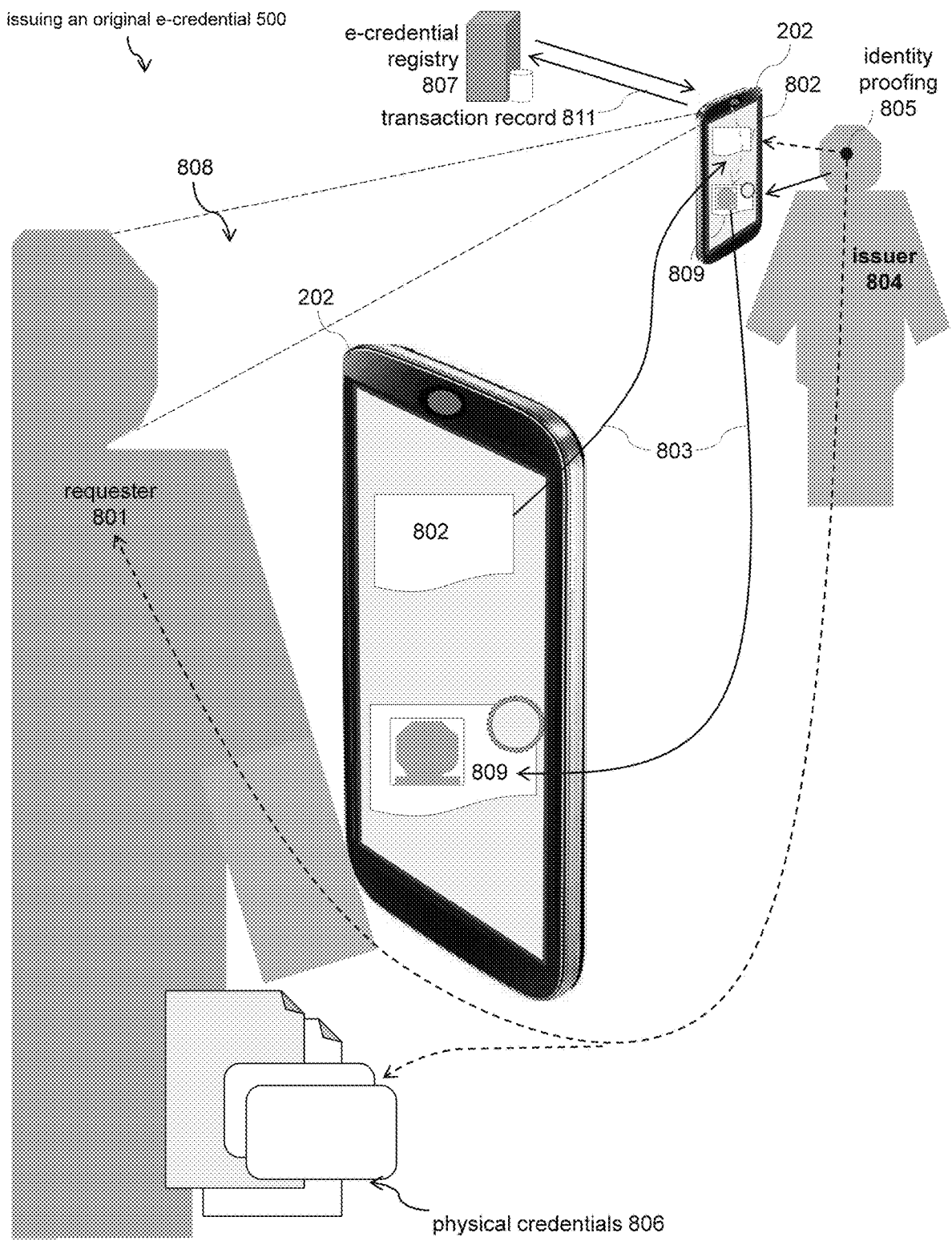
Figure 8 Usage Scenario: Issuing an Original E-Credential

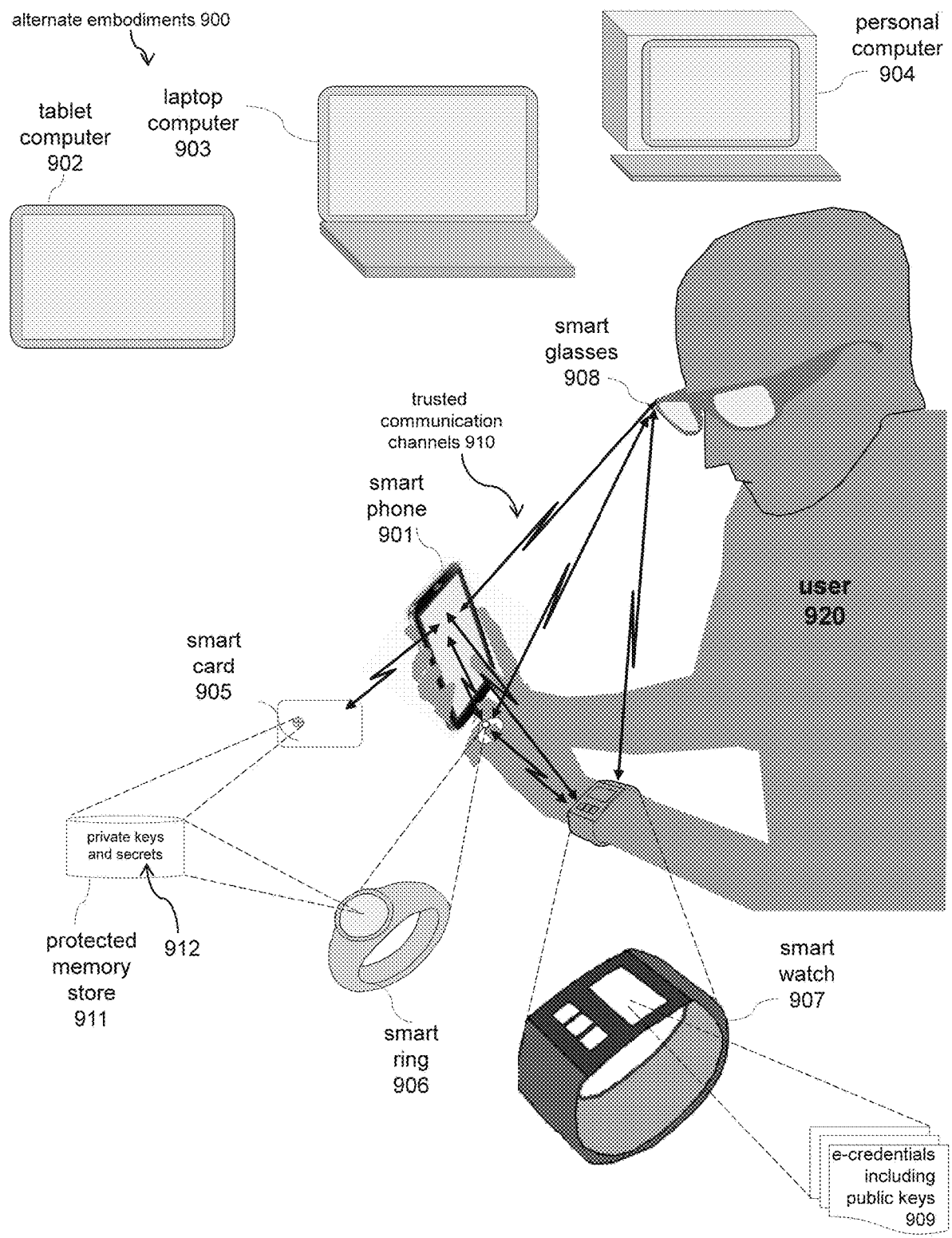
Figure 9 Alternate Embodiments of the Inventive Subject Matter

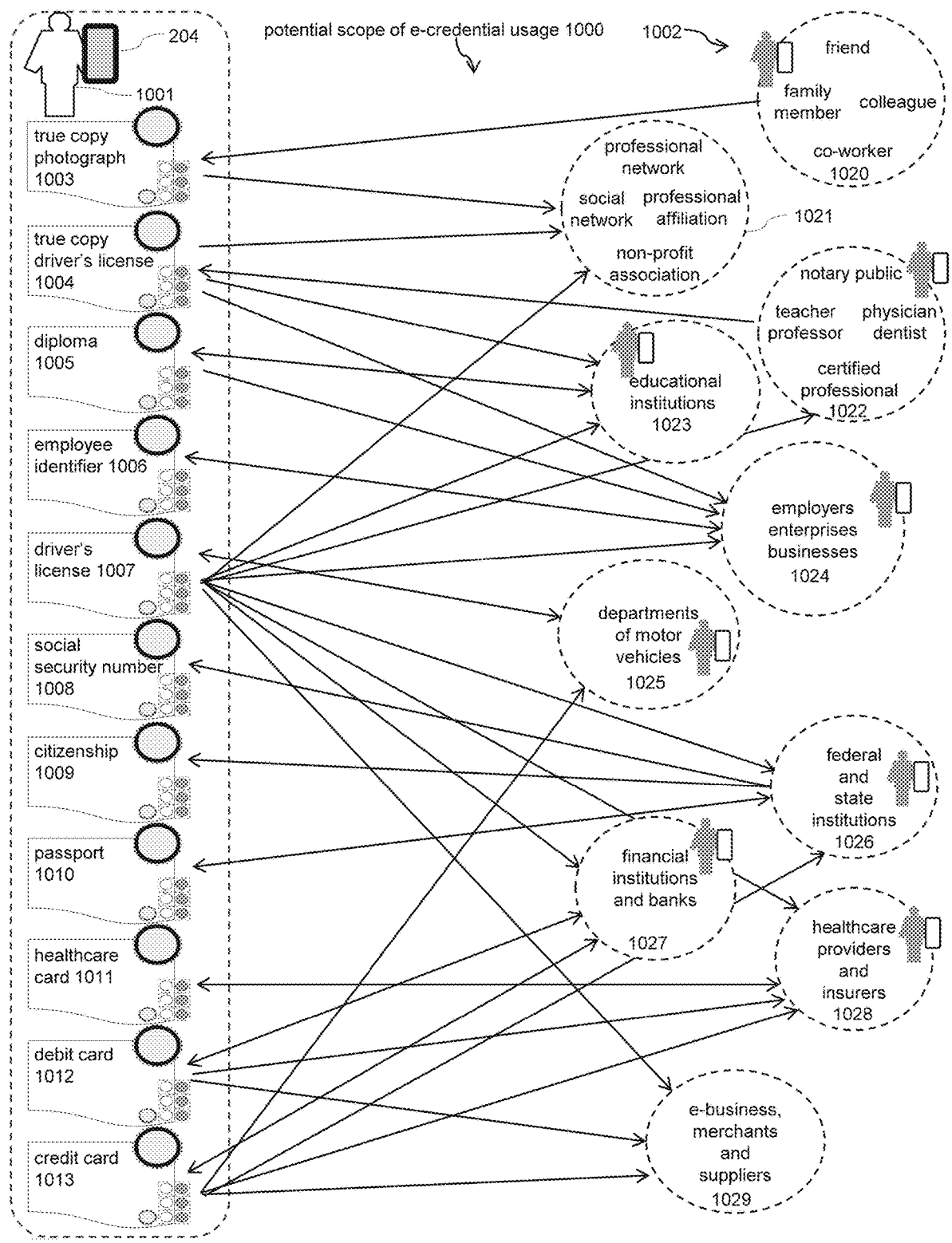
Figure 10 Depicting Potential Scope of E-Credential Usage

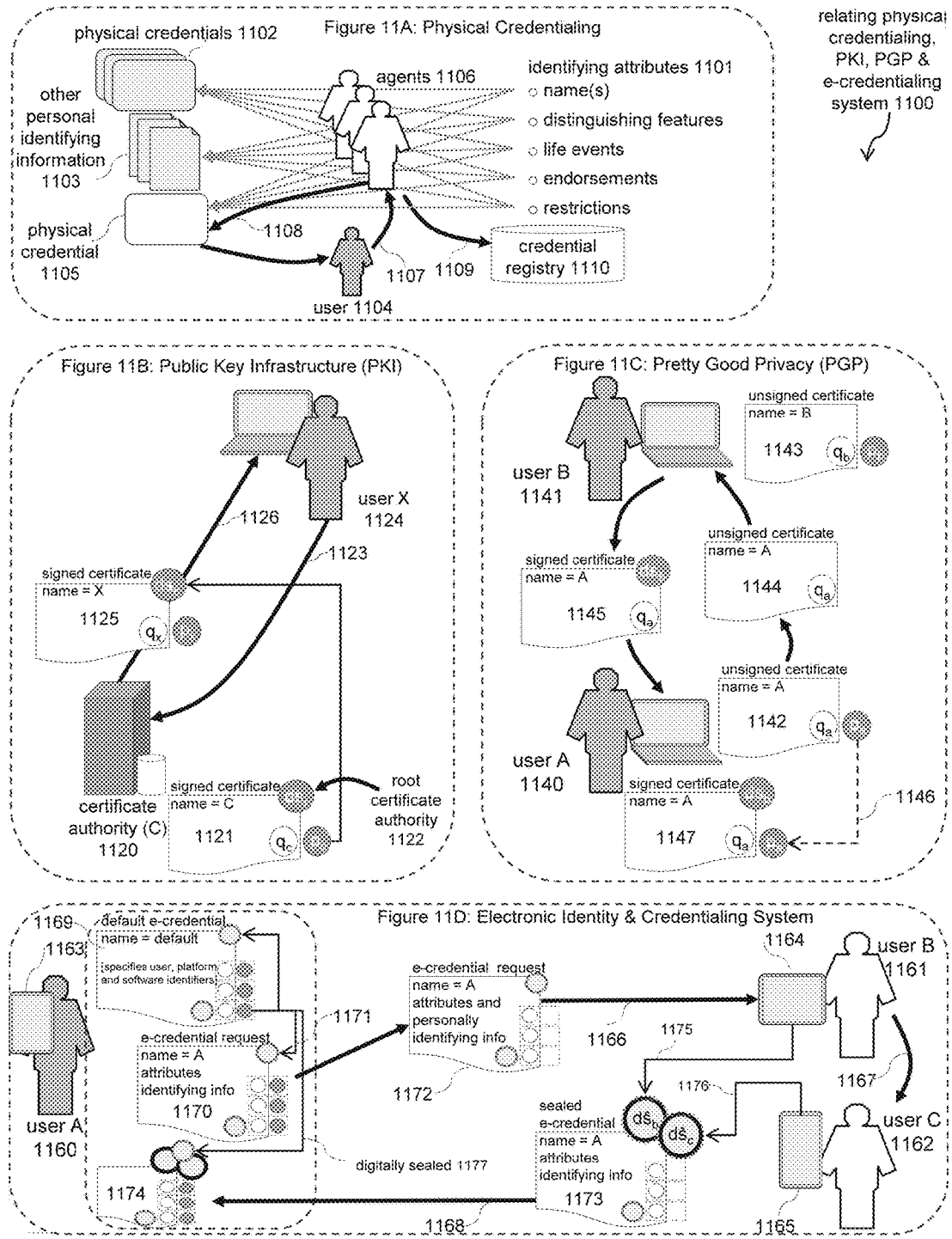
Figure 11 Relating Physical Credentialing, PKI, PGP & E-Credentialing System

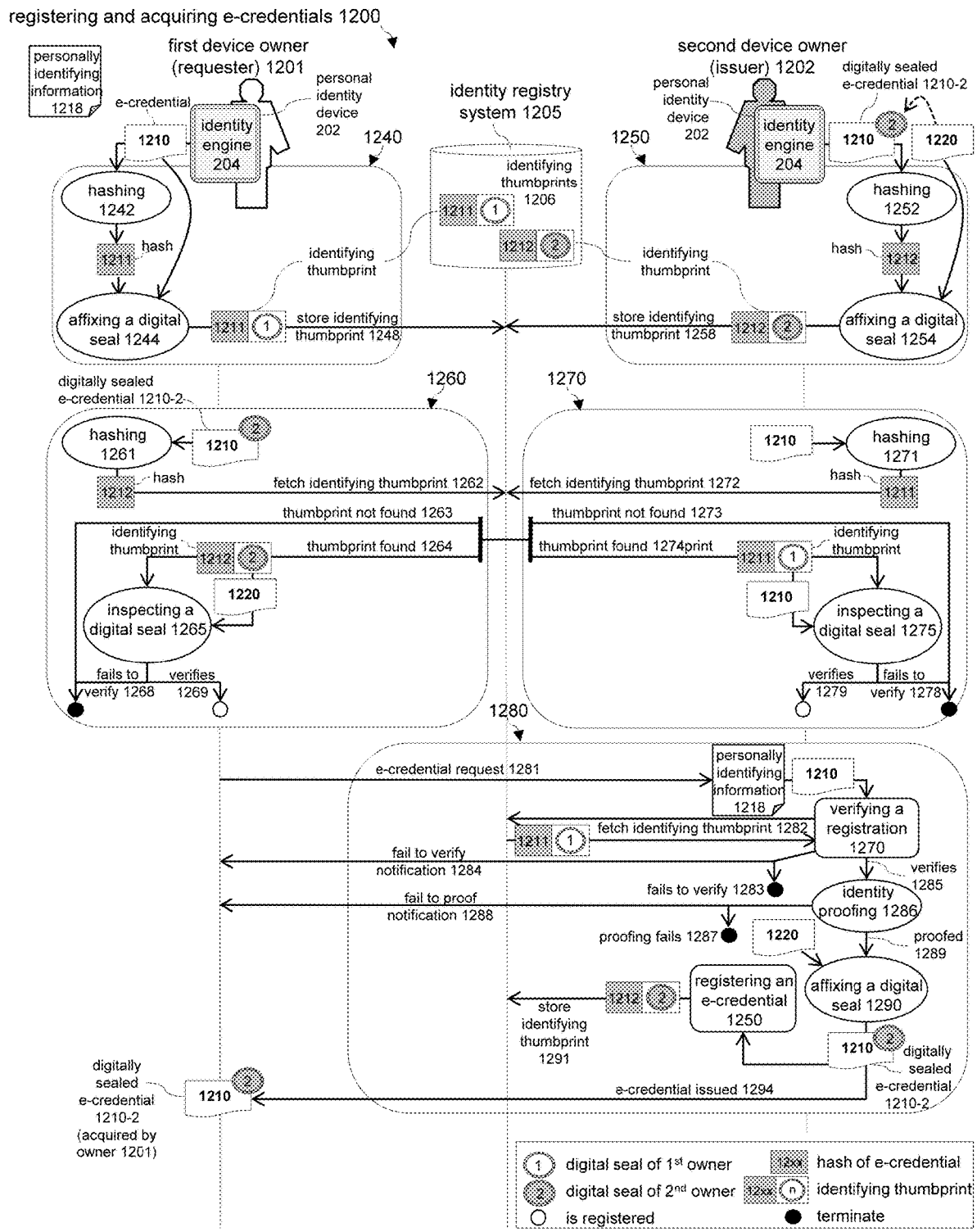
Figure 12 Registering and Acquiring E-Credentials

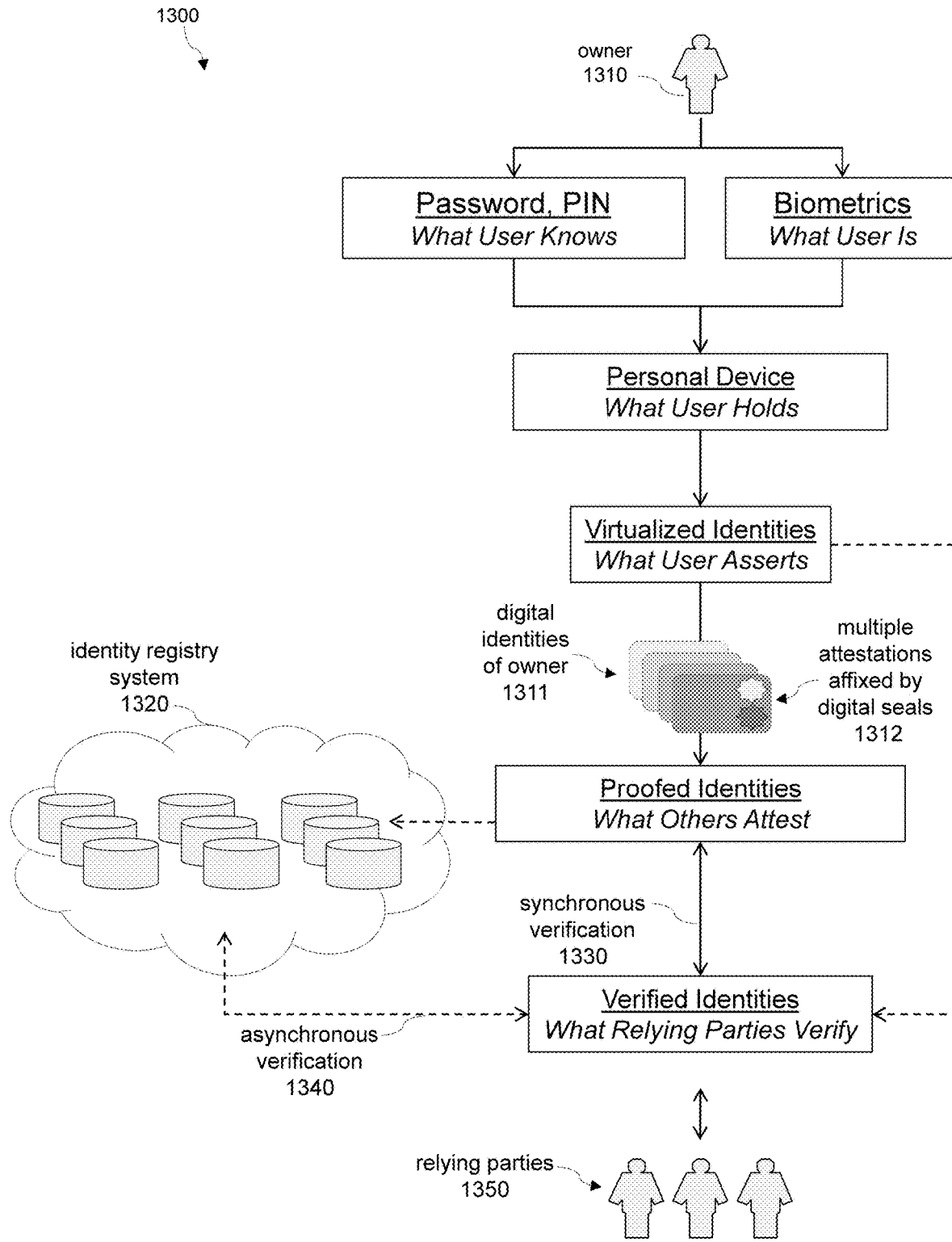
Figure 13 Core Attributes of Digital Identity

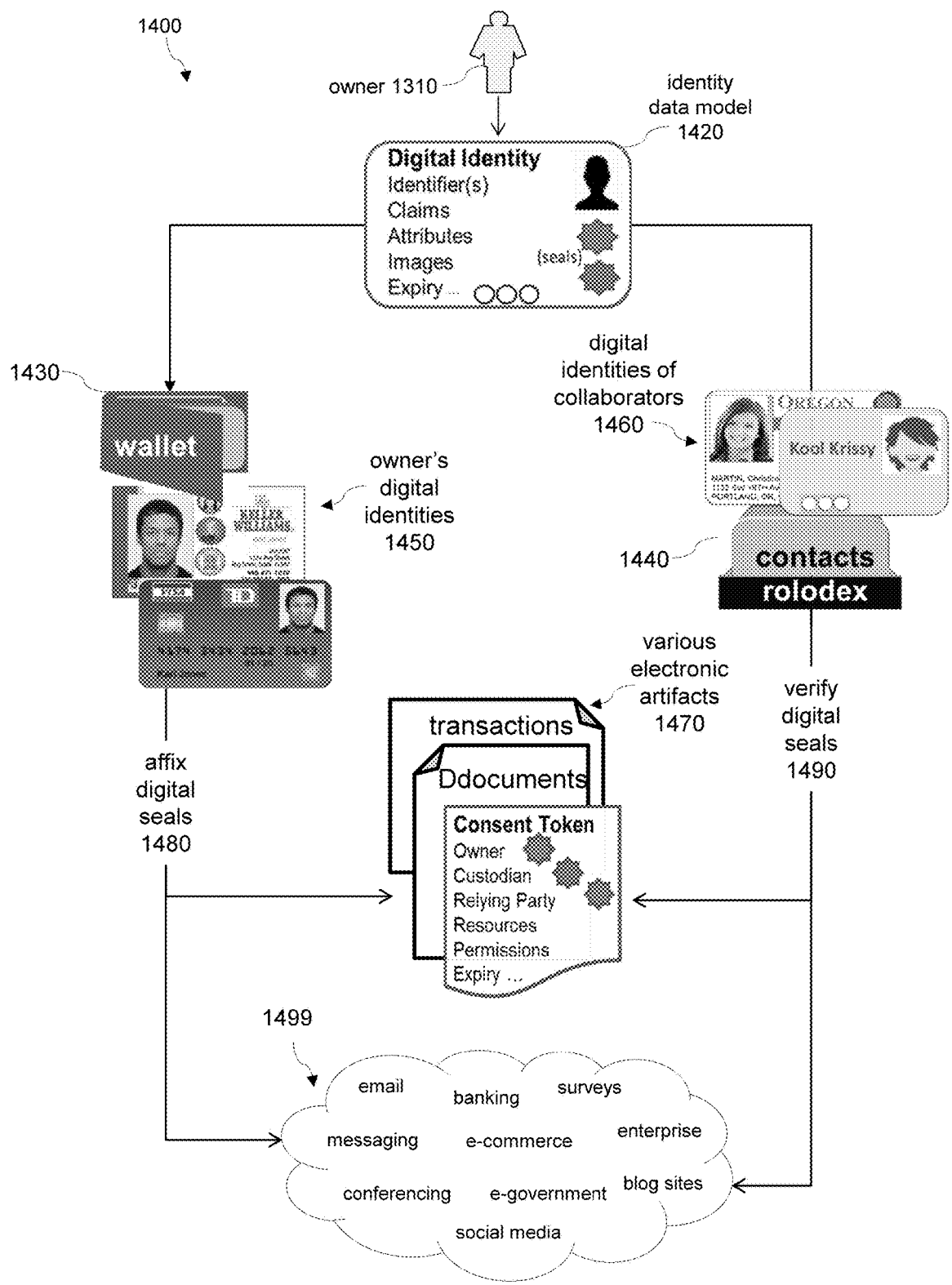
Figure 14 Virtualized Identity Enhances Privacy

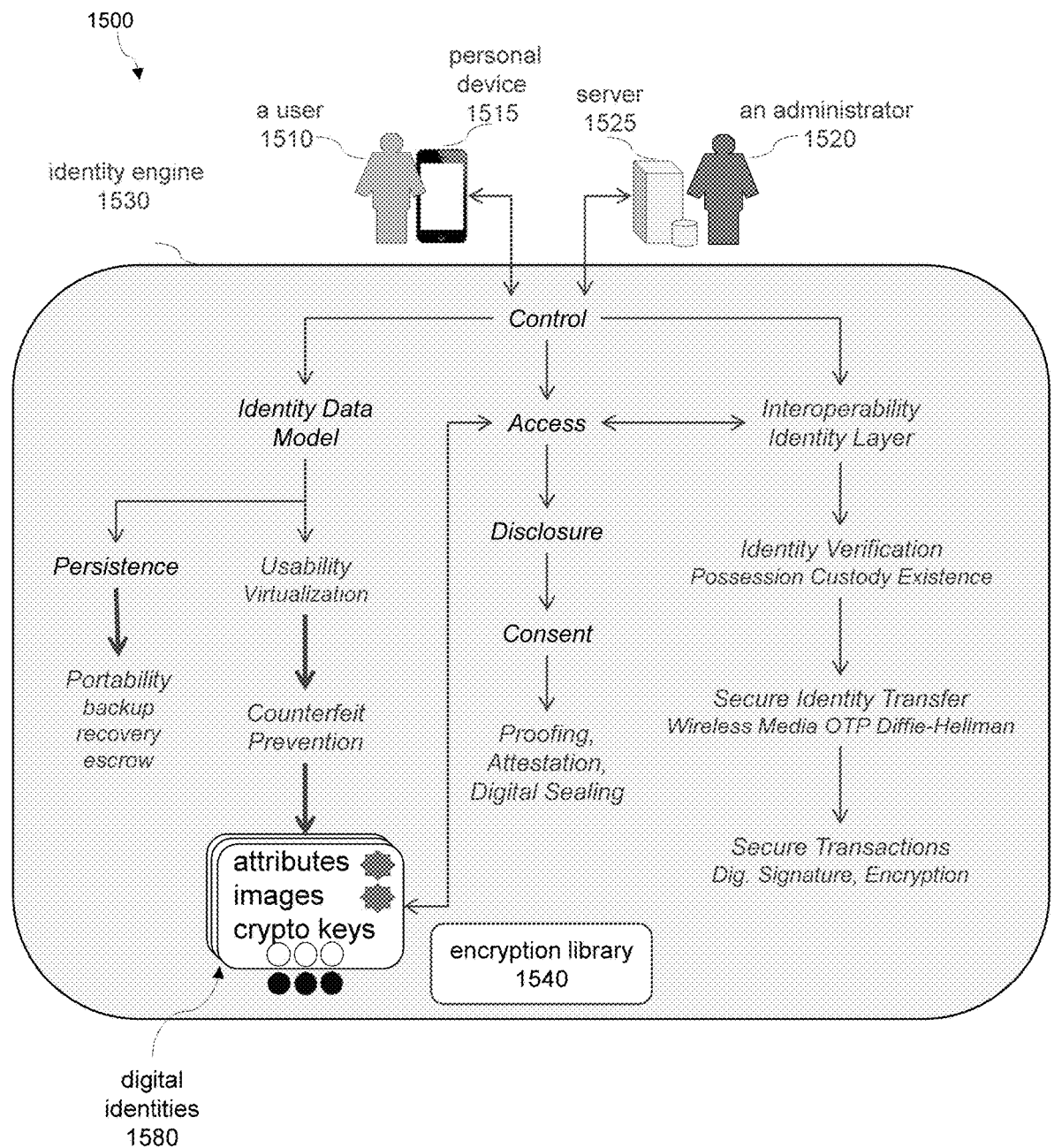
Figure 15 Properties of Self-Sovereignty

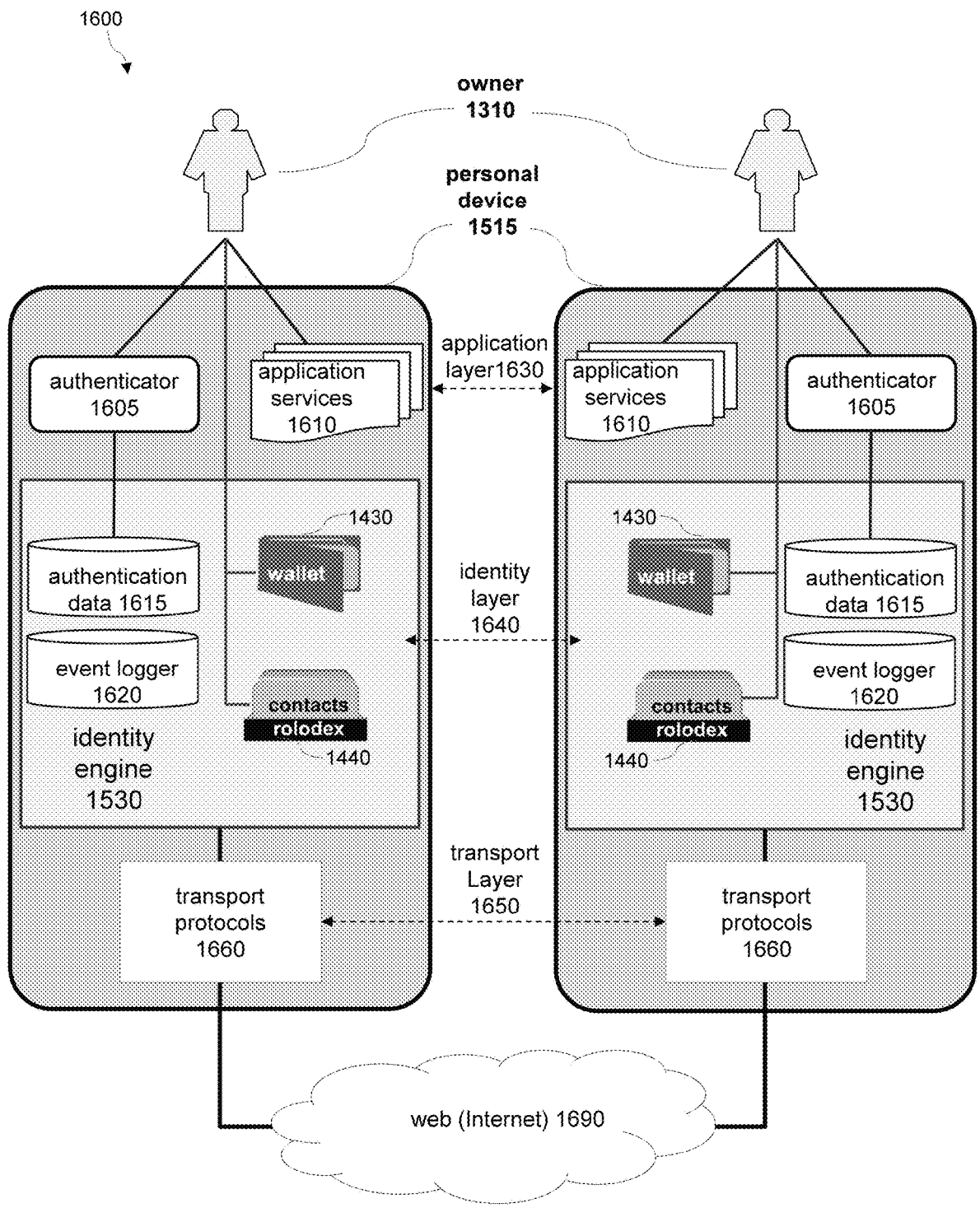
Figure 16 Identity Layer for the Web is Crucially Needed

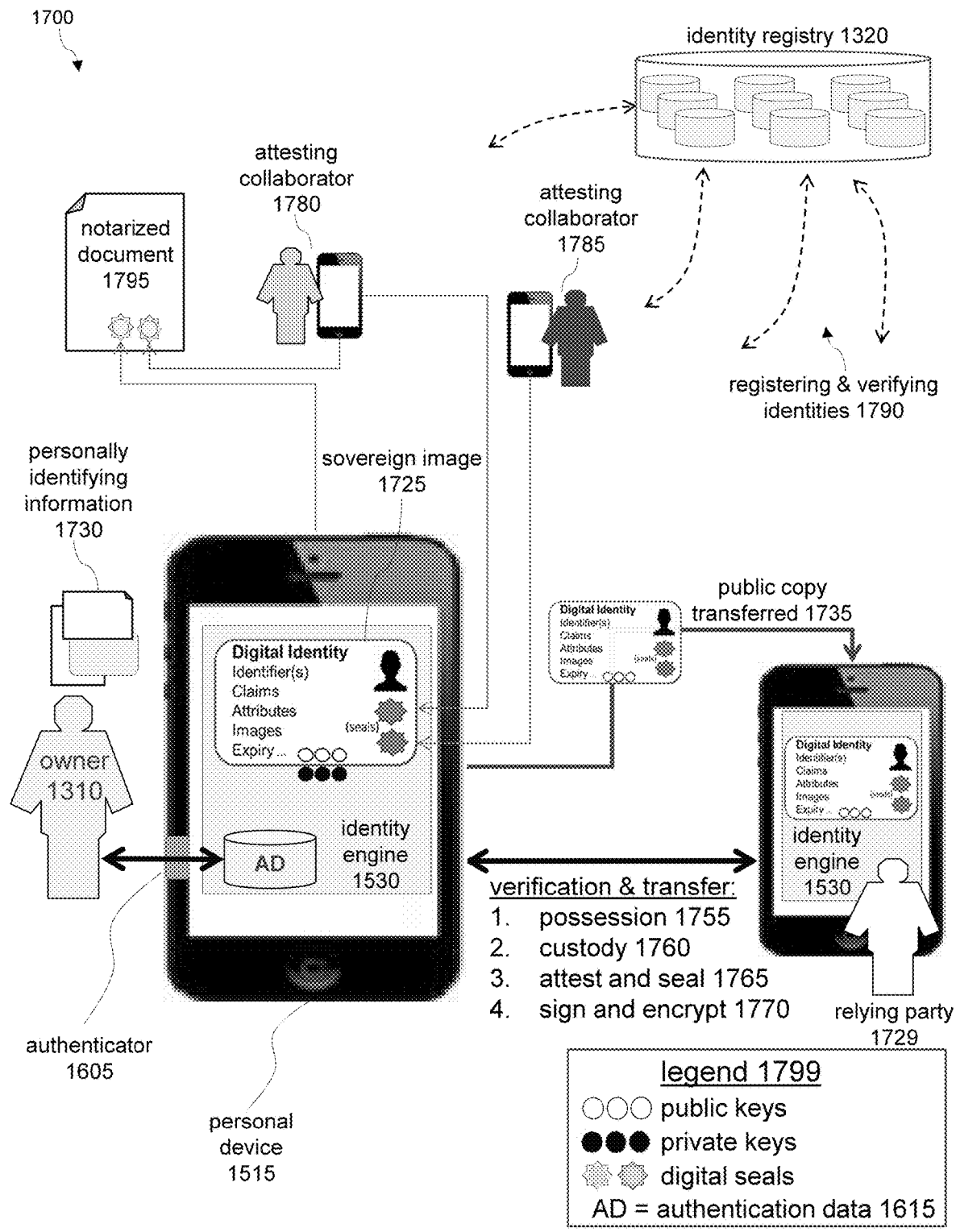
Figure 17 Authentication, Identity Verification, and Identity Assurance

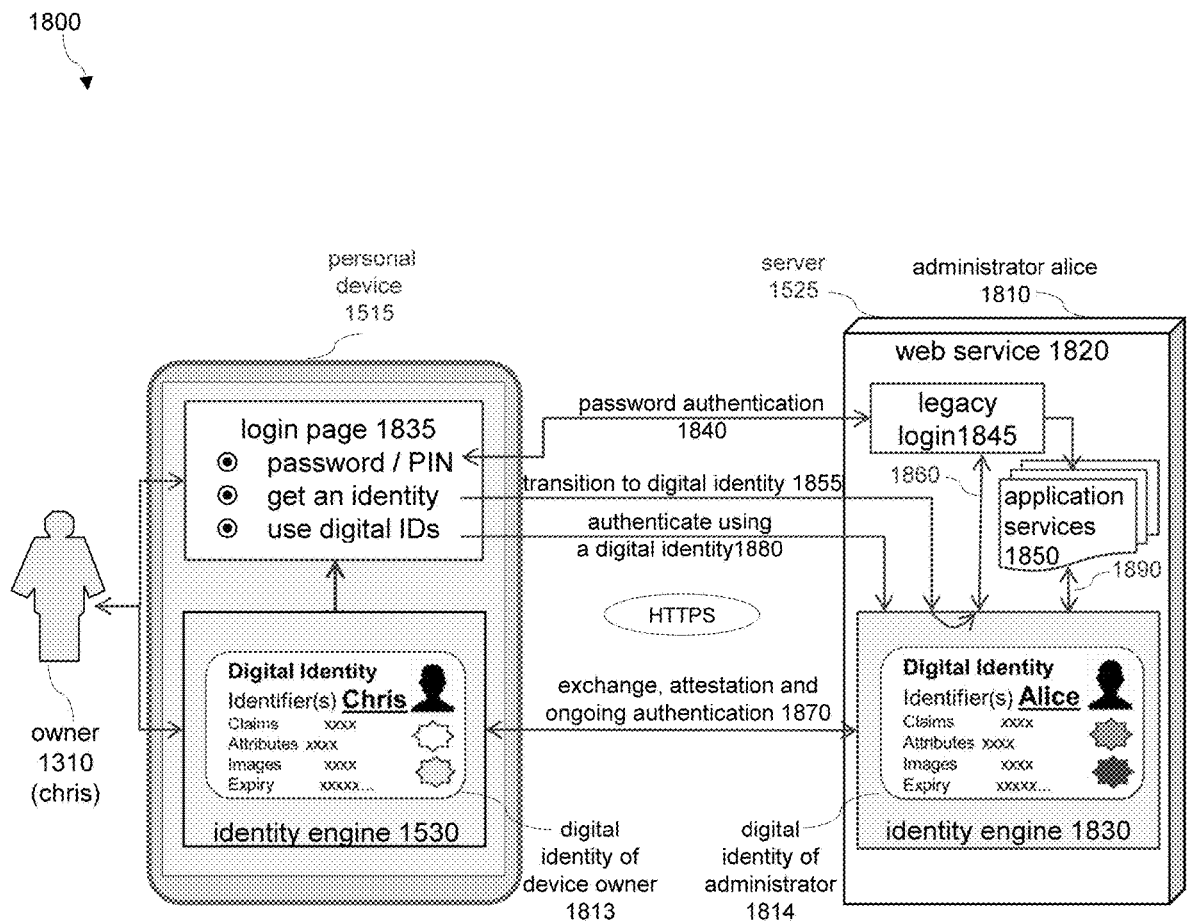
Figure 18 Identity Exchange Using Legacy Login

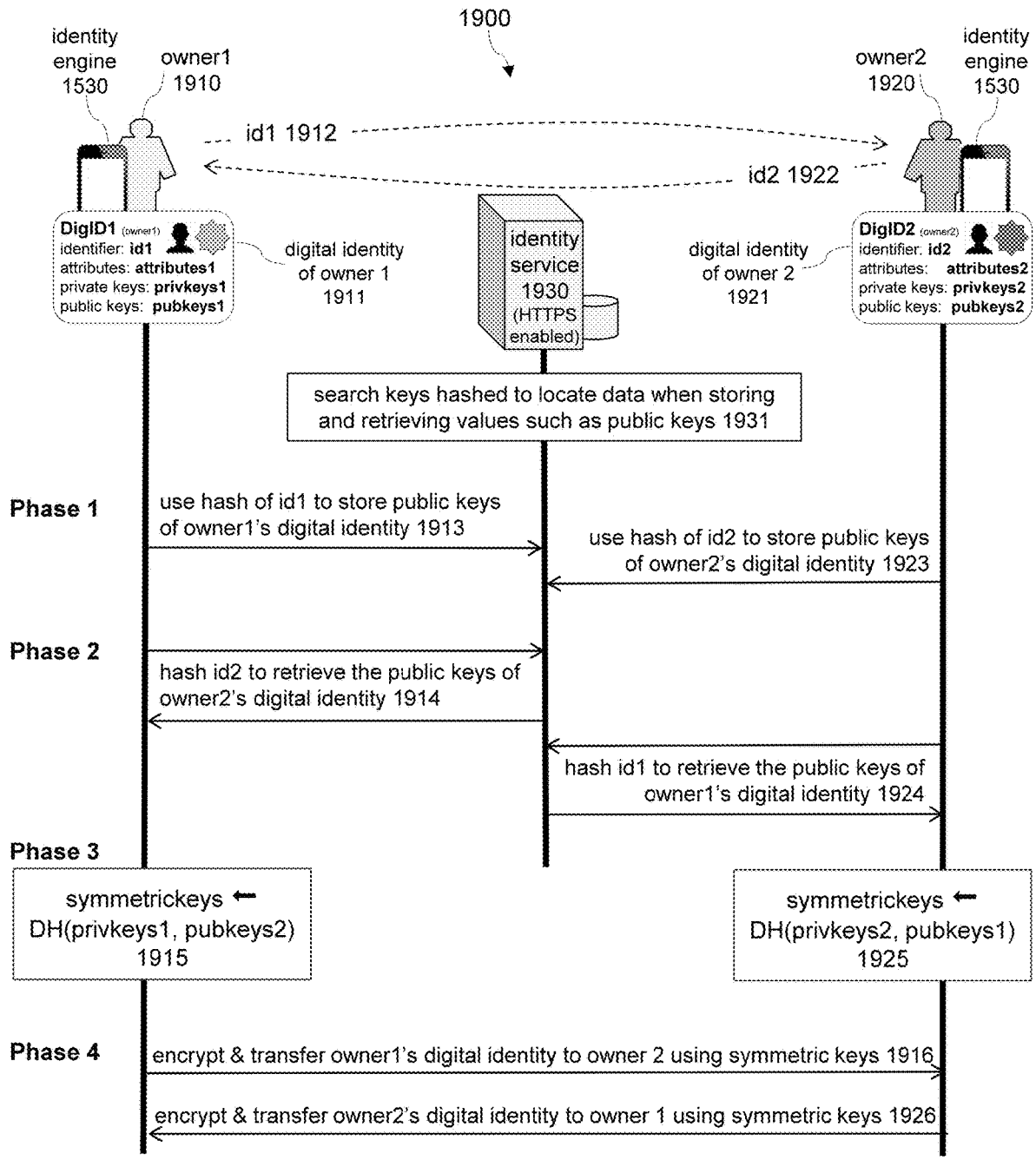
Figure 19 Identity Exchange Using Diffie-Hellman

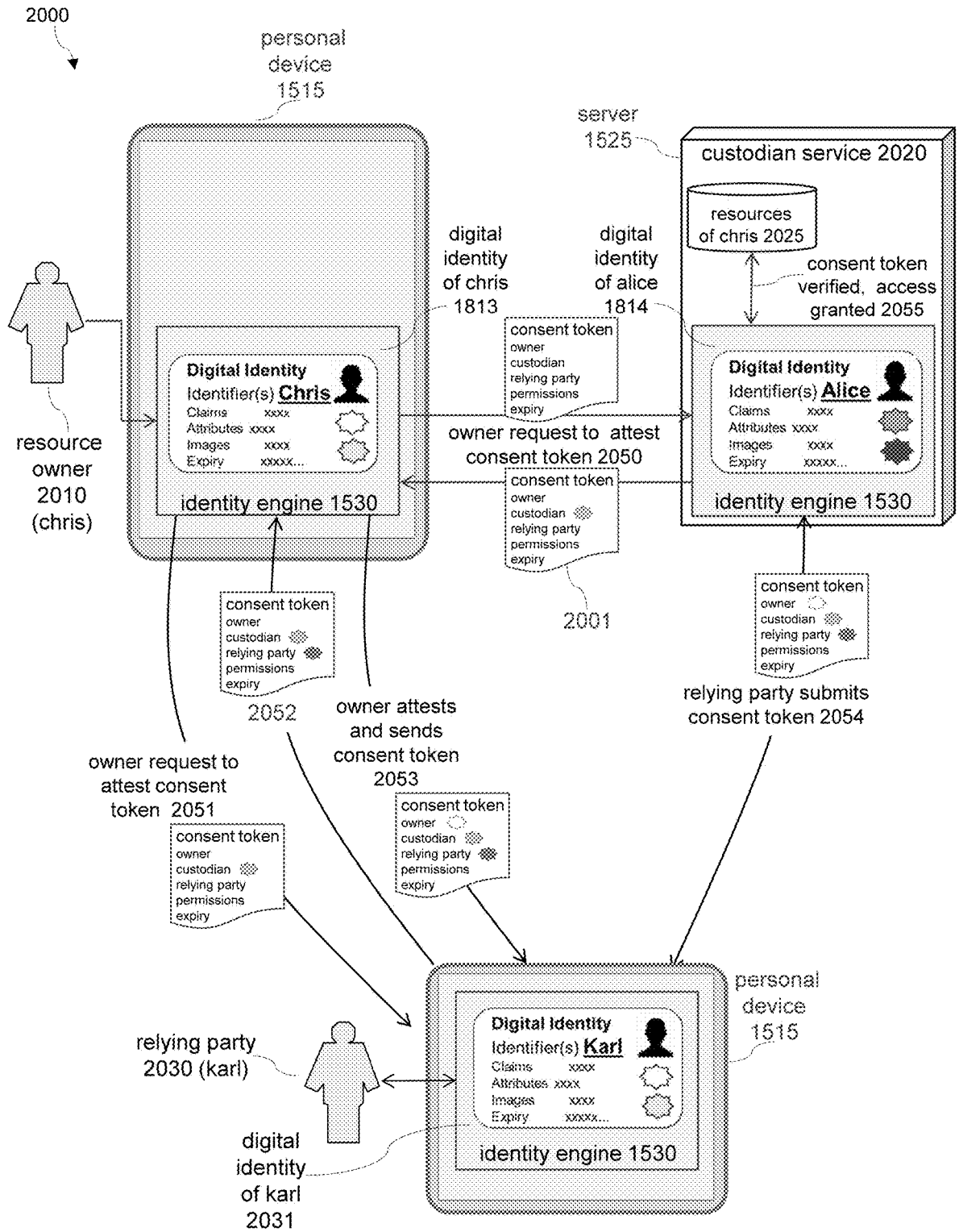
Figure 20 Self-Sovereign Consent Delegation

ARCHITECTURE AND METHODS FOR SELF-SOVEREIGN DIGITAL IDENTITY

CROSS REFERENCES TO RELATED APPLICATIONS

This application claims the benefit of U.S. Provisional Patent Application No. 62/742,895, filed Oct. 8, 2018 and U.S. Provisional Patent Application No. 62/743,350, filed Oct. 9, 2018. Which is incorporated herein by reference in its entirety. This application is a continuation-in-part application of U.S. Utility patent application Ser. No. 15/898,617, filed Feb. 18, 2018, which claims the benefit of U.S. Provisional Patent Application No. 62/575,301, filed Oct. 20, 2017. Which is incorporated herein by reference in its entirety. The U.S. Utility patent application Ser. No. 15/898,617, filed Feb. 18, 2018 is a continuation-in-part application of U.S. Utility patent application Ser. No. 14/503,797, filed Oct. 10, 2014, which claims the benefit of U.S. Provisional Patent Application No. 61/885,251, filed Oct. 1, 2013. Which is incorporated herein by reference in its entirety. The U.S. Utility patent application Ser. No. 15/497,635, filed Apr. 26, 2017 is a divisional application of U.S. Utility patent application Ser. No. 14/503,797, filed Oct. 10, 2014. which is incorporated herein by reference in its entirety.

FIELD

The inventive subject matter relates to systems and methods for self-sovereign digital identity architecture.

BACKGROUND

The terms "identity", "credential", "electronic credential", "e-credential", "identity credential", "web identity", "online identity", "digital persona" and "digital identity" have been used, more or less, synonymously in the literature and by practitioners. In the current context, "self-sovereign digital identity" and "self-sovereign identity" specifically denote electronic identities that are tightly controlled by their owners.

The identity crisis caused by concentration and centralization of control over identity by web service providers, excessive capture of personal and private information, and over-dependency on passwords to authenticate users, has led our research for better ways to establish digital identities and use them to enhance user privacy, and secure transactions.

Today, private information is widely scattered to support a patchwork of identity schemes, bridges, add-ons, and protocols for identity access and management. Remote information access and sharing is much too dependent on passwords which can be stolen, lost, cracked, and hacked. Many web-based business models capture enormous volumes of private information while providing inadequate governance, control, and privacy protection. Most consumers/citizens are unaware or oblivious to the risks. The alarming growth of service provider repository breaches, disclosure of private data, fraud, and unattributed information, confirm that the identity crisis has not been solved.

The Internet needs a generative user-centric identity platform whereby users have and control and use richly specified digital identities by means of a single simple protocol across and "identity layer" that everyone implements.

Further, digital identities should be highly intuitive and easy to use, mimicking identity issuance in the real world.

Examples of identity on the web in the context of existing identity technologies and familiar processes used to issue physical identities include passports, driver licenses, bank cards, and credit cards issued to their owners.

Online user access and collaboration continues to be predominately secured by server-centric remote authentication methods including remote access passwords and biometric authenticators-controlled service providers. To overcome the limitations of server-centricity, self-sovereign identity schemes provide digital identities that can be completely controlled by their owners.

FIDO (Fast IDentity Online) is a consortium of companies offering authenticators that employ biometrics, time, counters and PINs to locally authenticate users, remotely binding them to online services by way of public-private key-pairs. Leoutsarakos discloses vulnerabilities in the FIDO protocol including the lack bilateral challenge-response protocol and the use of a single key-pair per online account. The present invention improves upon FIDO by combining user authentication with identity, proofing and attestation of the user, while supporting both online and peer-to-peer (owner-to-owner) secure collaboration.

OpenID Connect specifies protocols whereby web services control the provisioning of identity and access tokens enabling password-authenticated users to grant relying parties access to their web resources. Mladenov and Mainka disclose security flaws in the web server and client-side software and protocols. The present invention overcomes shortcomings by using self-sovereign digital identities to replace or augment passwords, and digitally seal consent tokens managed and controlled directly by their owners.

The Signal Messaging Protocol, formally analyzed by Cohn-Gordon et al. explains that this protocol for peer-to-peer messaging leverages long-term, medium-term, one-time, and ephemeral key-pairs, including key derivation and ratchet functions, to achieve strong forward and future secrecy. Signal's Key Agreement Protocol adapts the Diffie-Hellman method. However, Signal does not deliver identities characterizing collaborating parties, does not support identity proofing and attestation, and does not include methods verifying acquired or presented digital identities of collaborators.

Diffie-Hellman Key Exchange is a method relying on Elliptical Curve (EC) public-private key cryptography that enables collaborating parties to create a shared symmetric key to exchange information across an insecure channel. Hoffstein et. al. of Brown University explain that collaborators can each pick a secret private key, use exponentiation to create their public keys, and independently calculate the same shared secret key without knowing the private key of the other party.

The present invention adapts Diffie-Hellman to exchange self-sovereign digital identities including their embedded public keys.

Glossary of Relevant Terms

Self-Sovereign Digital Identity: denotes electronic identities that are specified and tightly controlled by their owners, specifying selected attributes of the owner, or possibly, none of them.

Self-Sovereign Identity: Denotes a self-sovereign digital identity in this context.

Sovereign Image: The "golden master" of a self-sovereign digital identity including selected claims, attributes and images characterizing the owner including generated public and private encryption keys, forming a cohesive object vaulted by the identity engine.

Public Copy of a Digital Identity: Includes the specified claims, attributes and images of a given digital identity chosen to be disclosed by the owner, including the public keys generated for the digital identity, but not the paired private keys.

Consent: Denotes express consent for another party to use private and personally identifying information of a person for intended purpose(s), also known as "informed consent".

Consent Token: Denotes an artifact that can be used to specify and communicate express consent granting access to specified resources of an owner, including update and usage permissions, and disposal obligations, of collaborating parties and custodial services.

SUMMARY

The present inventive subject matter describes an architecture for digital identity on the web that integrates user authentication, cryptographic methods, and hashing, with identity specification, virtualization, proofing, and attestation.

It is an objective to provide a system which mimics identity handling in the physical world to provide users digital identities they can use to intuitively prove who they are. This capability elevates usability and ease-of-use, and will thereby facilitate technology acceptance and adoption.

It is another objective to provide digital identities that are self-sovereign and capable of being completely controlled by the owner with the assistance of a software agent installed on the owner's personal device. Such an agent will help the owner make informed privacy and security policy decisions, and reduce the likelihood of human error that would expose personally identifying and private information.

It is yet another objective to provide a digital identity with a sovereign image that includes private owner information plus public/private key-pairs that prevent counterfeiting and impersonation, and can be used to secure transactions and ensure that owners cannot repudiate their actions when identifying themselves, attesting digital identities and other artifacts, and registering digital identities. This feature reinforces mutually accountability of collaborating parties.

Another remarkable feature is that relying parties can leverage their identity engines to combine computational verification tests, namely, proof-of-possession, proof-of-custody and proof-of-existence, thereby enabling significantly elevated levels of identity assurance.

Adapting the Diffie-Hellman Key exchange protocol to transfer digital identities is also a distinguishing feature. The present invention combines the transfer the attributes of digital identities with the transfer of public keys. This adapted method promises to also significantly increase cryptographic strength. A digital identity of the present invention has three key-pairs that can be used to generate symmetric keys enabling triple encryption.

Another remarkable benefit is that digital identities that are self-sovereign mitigate the risks associated with the management of consent by service providers. The architecture's consent model enables owners to use digital seals to control delegation and verification of consent for the purpose of granting access to their private web resources.

LIST OF REFERENCE CHARACTERS 100 electronic identity and credentialing system
101 users with personal identity devices
102 smart phones
103 tablet computers
104 laptop computers
105 service providers
106 identity services
107 transactions between users and service providers
108 transactions between users and identity providers
109 e-credential requesting user (a requester)
110 personal identifying information
111 e-credential requests
112 e-credential issuing users (an issuer)
113 issued e-credential
114 mutually trusted channels
115 if agent, sends e-credential copy to identity provider
116 identity service
120 personal computers
200 personal identity device and identity bindings
201 owner (a user)
202 personal identity device
203 personal identifying information in custody of owner
204 identity engine
205 custody of device in custody of owner 201
206 user interface
207 camera
208 photographing owner
209 photographing personal identifying information
210 knowledge-based binding (e.g. password, PIN)
211 biometric module
212 personal identifying information in custody of owner 201
213 protected memory store (ignition key)
214 custody of ignition key (removable protected memory store)
215 biometric binding
216 logical binding between user interface 206 and authentication data 226
217 logical binding between biometric module 211 and authentication data 226
218 crypto-logical bindings between public and private keys associated with e-credentials of owner 220
219 authentication control
220 e-credentials of the owner
225 public keys embedded in e-credentials of owner
226 authentication data
227 private keys of e-credential of owner 220
230 e-credentials of other users
235 public keys embedded in e-credentials of other users
240 communications interface
245 documents and messages in a personal identity device
260 device identifier
265 identity engine identifier
270 legend: identity bindings
275 legend: public-private encryption keys
290 other users (issuers) with e-credentials
291 digital seals affixed to e-credentials by other users
292 digital seal affixed to a document by another user
293 cryptographic bindings between issuers 290 and e-credentials of owner 220 and a document 245 by way of digital seals
294 digital seals affixed to e-credentials of other users
295 digital seal applied to a document using an e-credential of the owner 220
296 cryptographic binding by way of a digital seal affixed to a document using an e-credential of the owner 220
300 collaborations among users with personal identity devices
301 user (requester)
302 user (issuer)
303 user has an e-credential issued by another party 390 collaborating users can establish persistent secure sessions by exchanging e-credentials and using the encryption key pairs associated with their e-credentials
392 an issuer 302 attests to the identity of a requester 301 wherein the issuer cannot repudiate having proofed the requester's identity
394 users can use e-credentials proofed and attested to by other parties to establish secure sessions—user 301 provides user 303 an e-credential issued by user 302, while user 303 provides user 301 an e-credential issued by a different party
400 electronic credentials and relationships
401 e-credential of an owner (a user)
402 default e-credential
403 e-credentials of issuers
404 e-credentials of other users
405 personal identifying information
406 digital seals created using e-credentials of issuers
407 digital seals affixed to e-credential 401
408 e-credential of owner 401 used to issue e-credentials to other users
409 digital seals affixed to e-credentials of other users
410 self-sealed default e-credential
411 e-credential attributes
412 owner attributes of the e-credential owner
413 each digital seal associated with e-credential issuing record
414 e-credential issuing records
423 digital sealing images
416 three (s) public-private encryption key pairs
417 public keys (3) embedded into e-credential 401
418 private keys (3) in protected memory store 213
440 attributes of e-credential attested by issuer
441 attributes of e-credential conferred by issuer
442 sign/verify documents and messages
443 encrypt/decrypt documents and messages
444 embossing key used to create digital seals
445 inspection key used to verify digital seals
450 credential template (an empty unsealed electronic credential)
500 Method for handling digital seals
501 an electronic artifact (e.g. document, message, e-credential)
503 electronic artifact identifier
505 binding between digital seal and electronic artifact using the identifier of the artifact
510 attestation of an e-credential owner
512 issue date of digital seal (possibly including time)
517 e-credential identifier
519 affixing a digital seal
520 inspecting a digital seal
521 e-credential of the owner
522 pre-determined identifying attributes of e-credential
523 digital sealing image
524 inspection key (i)
525 embossing key (c)
526 pre-determined elements of electronic artifact
528 digital seal
529 digest
530 hash digest function
531 hashed digest
532 emboss function
533 digital seal signature
534 affix function
540 extract function
541 inspect function
542 hash result function
543 compare function
544 result
545 hashed result
546 expected hash
547 "digital seal verified"
548 "digital seal failed to verify"
600 issuing true copy e-credential of a physical credential
601 e-credential requester
602 requester takes a photograph of a physical credential
603 photograph of physical credential
604 physical credential
605 e-credential request
606 mutually trusted channel established
607 e-credential issuer
608 identity proofing
609 true copy e-credential
610 transaction record
611 e-credential registry
700 issuing true copy self-photograph e-credential
701 e-credential requester
702 requester takes self-photograph
703 e-credential request
704 self-photograph
705 mutually trusted channel established
706 e-credential issuer
707 identity proofing
709 true copy self-photograph e-credential
710 transaction record
711 e-credential registry
800 issuing an original e-credential
801 e-credential requester
802 e-credential request
803 mutually trusted channel established
804 e-credential issuer
805 identity proofing
806 physical credentials
807 e-credential registry
808 digital photograph
809 issued e-credential
811 transaction record
900 alternate embodiments
901 smart phone
902 tablet computer
903 laptop computer
904 personal computer
905 smart card
906 smart ring
907 smart watch
908 smart glasses
909 e-credentials of the user including public keys
910 mutually trusted channel established
911 protected memory store
912 private keys and secrets
920 user
1000 potential scope of electronic credential usage
1001 user holding a personal identity device
1002 representative e-credential issuing users holding personal identity devices
1003 true copy photograph
1004 true copy driver's license
1005 diploma
1006 employee identifier
1007 driver's license
1008 social security number
1009 citizenship
1010 passport
1011 healthcare card 1012 debit card
1013 credit card
1020 friend, family member, colleague, co-worker
1021 professional network, social network, professional affiliation, non-profit association
1022 notary public, teacher, professor, physician, dentist, certified professional
1023 educational institutions
1024 employers, enterprises, businesses
1025 departments of motor vehicles
1026 federal and state institutions
1027 financial institutions and banks
1028 healthcare providers and insurers
1029 e-business merchants and suppliers
1100 relating physical credentialing, PKI, PGP and e-credentialing system
11A: Physical Credentialing
1101 identifying attributes
1102 physical credentials
1103 other personal identifying information
1104 user
1105 physical credential
1106 agents
1107 credential request
1108 agent issues physical credential
1109 writes credential and transaction record
1110 credential registry
11B: Public Key Infrastructure (PKI)
1120 certificate authority (C)
1121 signed [digital] certificate, name=C
1122 root certificate authority
1123 certificate request
1124 user X
1125 signed digital certificate, name=X
1126 signed digital certificate issued
11C: Pretty Good Privacy (PGP)
1140 user A
1141 user B
1142 unsigned digital certificate, name=A (associated with private key)
1143 unsigned digital certificate, name=B (associated with private key)
1144 unsigned digital certificate, name=A (disassociated from private key)
1145 signed digital certificate, name=A
1146 private key associated with public key of signed certificate
1147 signed digital certificate, name=A (associated with private key
11D: Electronic Identity and Credentialing System
1160 user A
1161 user B
1162 user C
1163 personal identity device
1164 personal identity device
1165 personal identity device
1166 first step of round-robin issuing process
1167 second step of round-robin issuing process
1168 third step of round-robin issuing process
1169 default credential, name=default
1170 e-credential request, name=A (associated with private keys)
1171 default e-credential embossing key digitally seals request
1172 e-credential request, name=A (disassociated from private keys which are thereby not revealed)
1173 sealed e-credential, name=A (sealed by user A and user B)
1174 newly issued e-credential
1175 digital seal of user B applied
1176 digital seal of user C applied
1177 embossing key of selected credential digitally seals issued e-credential (e.g. default e-credential)
1200 registering and acquiring e-credentials
1201 first device owner (requester)
1202 second device owner (issuer)
1205 identity registry system
1206 identifying thumbprints
1210 e-credential
1210-2 digitally sealed e-credential
1211 hash
1211-1 identifying thumbprint
1212-2 identifying thumbprint
1218 personally identifying information
1220 e-credential
1221 hash
1221-2 identifying thumbprint
1240 registering an e-credential
1242 hashing
1244 affixing a digital seal
1248 store identifying thumbprint
1250 registering an e-credential
1252 hashing
1254 affixing a digital seal
1258 store identifying thumbprint
1260 verifying a registration
1261 hashing
1265 inspecting a digital seal
1268 fails to verify
1269 verifies
1270 verifying a registration
1271 hashing
1275 inspecting a digital seal
1278 fails to verify
1279 verifies
1280 requesting and issuing an e-credential
1281 e-credential request
1282 fetch identifying thumbprint
1283 fails to verify
1284 fail to verify notification
1285 verifies
1286 identity proofing
1287 fails to proof
1288 fail to proof notification
1300 core attributes of digital identity
1310 owner
1311 digital identities of owner
1312 multiple attestations and digital seals
1320 identity registry system
1330 synchronous verification
1340 asynchronous verification
1350 relying parties
1400 virtualized identity enhances privacy
1420 identity data model
1430 (electronic) wallet
1440 (electronic) rolodex of contacts
1450 owner's digital identities
1460 digital identities of collaborators
1470 various electronic artifacts
1480 affix digital seals
1490 verify digital seals
1499 full range of use cases
1500 properties of self-sovereignty 1510 a user
1515 personal device
1520 administrator
1525 server
1530 identity engine
1540 encryption library
1580 digital identities
1600 identity layer for the web is crucially needed
1605 authenticator
1610 application services
1615 authentication data
1620 event logger
1630 application layer
1640 identity layer
1650 transport layer
1660 transport protocols
1690 web (Internet)
1700 authentication, identity verification and identity assurance
1725 sovereign image
1729 relying party
1730 personally identifying information
1735 public copy transferred
1755 (proof of) possession
1760 (proof of) custody
1765 attestation, sealing
1770 sign and encrypt
1780 attesting collaborator
1785 attesting collaborator
1790 registering and verifying identities
1795 notarized document
1799 legend
1800 identity exchange using legacy login
1813 digital identity of device owner (chris)
1814 digital identity of administrator (alice)
1810 administrator alice
1820 web service
1830 identity engine (of web service 1820)
1835 login page
1840 password authentication
1845 legacy login
1850 application services
1855 transition to digital identity
1860 (use legacy login to authenticate)
1870 exchange, attestation, authentication
1880 authenticate using a digital identity
1890 launch application services
1900 identity exchange using diffie-hellman
1910 owner 1
1920 owner 2
1911 digital identity of owner 1 (1910)
1921 digital identity of owner 2 (1920)
1912 id1 (identifier of owner 1)
1922 id2 (identifier of owner 2)
1930 identity service, HTTPS-enabled
1931 search keys are hashed to locate data
1913 use hash of id1 to store public keys of owner 1's digital identity
1914 hash id2 to retrieve the public keys of owner 2's digital identity
1915 calculate symmetrickeys (see 2099)
1916 encrypt and transfer owner 1's digital identity to owner 2 using symmetrickeys
1923 use hash of id2 to store public keys of owner 2's digital identity
1924 hash id1 to retrieve the public keys of owner 1's digital identity
1925 calculate symmetrickeys (see 2099)
1926 encrypt and transfer owner 2's digital identity to owner 1 using symmetrickeys
2000 self-sovereign consent delegation
2001 consent token
2010 resource owner (chris)
2020 custodian service
2025 resources of owner (chris)
2030 relying party (karl)
2031 digital identity of karl
2050 owner request to attest consent token
2051 owner request to attest consent token
2052 owner attests and sends consent token
2053 relying party submits consent token
2054 consent token verified, access granted

BRIEF DESCRIPTION OF DRAWINGS

The following figures show embodiments according to the inventive subject matter, unless noted as showing prior art.

FIG. 1 is a system diagram depicting users holding personal identity devices, communicating with identity services and service providers, and relationships between users, personal identifying information, and electronic credentials.

FIG. 2 is a diagram depicting an owner's personal identity device including personal identifying information, pre-installed identity engine, e-credentials retained within the identity engine, a protected memory store, known as an ignition key if removable, other users of personal identity devices, identity services, service providers, and various physical, knowledge-based, biometric, logical, and cryptological bindings among the artifacts comprising a personal identity device, as well as bindings with other users of personal identity devices.

FIG. 3 is a diagram depicting collaboration among users requesting, issuing, holding and using e-credentials.

FIG. 4 is a diagram depicting electronic credentials of users (e-credential owners), including attached personal identifying information, a default e-credential, and an e-credential template, the figure also depicting relationships between e-credentials of issuers and an e-credential owner, and e-credentials issued by an e-credential owner to other users of personal identity devices.

FIG. 5 is a diagram depicting Method for Handling Digital Seals.

FIG. 6 is a usage scenario diagram illustrating the creating of an e-credential with an attached photocopy of the physical credential thereby issuing of a true copy of a physical credential.

FIG. 7 is a usage scenario diagram illustrating the creating of an e-credential with an attached self-photograph, thereby issuing of a true copy of a self-photograph, and possibly creating an electronic business card.

FIG. 8 is a usage scenario diagram illustrating the issuing of an original electronic credential, for example, an electronic driver's license or banking card embedded in the user's personal identity device.

FIG. 9 depicts alternate embodiments of the electronic credentialing system that can be expected to emerge in the future.

FIG. 10 depicts the potential scope of applications and services that could benefit from deployments of the electronic identity and credentialing system in various economic sectors.

FIG. 11 relates physical credentialing, Public Key Infrastructure, Pretty Good Privacy (PGP), to the electronic identity and credentialing system.

FIG. 12 depicts selected scenarios illustrating the registration and acquisition of e-credentials by owners of personal identity devices.

FIG. 13 is a schematic diagram depicting the core attributes of digital identity enabling users to objectively and unambiguously prove who they are.

FIG. 14 illustrates that privacy and control can be enhanced by virtualizing digital identities.

FIG. 15 is a diagram showing and relating fourteen (14) critical design properties for self-sovereignty uncovered by our research.

FIG. 16 is a block diagram depicting our vision for an identity layer to improve interoperability, privacy, and security across the Web.

FIG. 17 is a schematic diagram depicting how authentication, identity verification (proof-of-possession and proof-of-custody), and identity assurances can be deployed.

FIG. 18 illustrates how existing users can leverage their legacy password-based authentication schemes to exchange digital identities and begin using them.

FIG. 19 is sequence diagram showing how the Diffie-Hellman key exchange protocol has been adapted for securely exchanging digital identities between collaborators.

FIG. 20 depicts how disclosure of private information can be delegated by means of self-sovereign consent tokens controlled by owners rather than providers.

DETAILED DESCRIPTION

Representative embodiments according to the inventive subject matter are shown in FIGS. 1 to 20, wherein similar features share common reference numerals. The specific embodiments are meant to be illustrative and not limit the scope of the invention and the various ways it may be embodied.

The inventive subject matter is an electronic credentialing system which includes personal identity devices of users [persons] capable of requesting and issuing electronic credentials, as well as exchanging electronic credentials over the web with identity services and service providers. A personal identity device is an adapted mobile computing device such as a smart phone, a tablet computer, a laptop computer, or personal computer with a pre-installed identity engine and a protected memory store. Users have physical credentials in their custody, and electronic credentials (e-credentials) maintained within the identity engine of their personal identity device(s). The protected memory store contains secrets including PINs, passwords, and passphrases of the device owner. An embodiment of a personal identity device could include a trusted execution environment to establish a trust zone to shield the identity engine and protected memory store from un-trusted software components.

A requesting user can submit an e-credential request to another user, the issuer, who proofs personal identifying information provided by the requester, digitally seals the e-credential including a declaration of the issuer, and returns the digitally sealed e-credential to the requester. Acquiring an attested to e-credential requires a requester to arrange an encounter [a session or meeting], or possibly a series of encounters, with issuer(s) to vet the requester by proofing their personal identifying information, for example, by matching the requester to the photograph and signature on their driver's license, and by asking probing questions to ferret out imposters. An in-person encounter is said to be one where the identity of the requester is proofed by the issuer face-to-face, typically in a private area. Online identity proofing can be conducted, for example, by way of audio-video conferencing (e.g. Skype) or telephone, wherein personal identifying information is submitted electronically. Online identity proofing appears to be more vulnerable to electronic fraud than in-person proofing. However, this disadvantage is mitigated when the requester is well-known by the issuer and the online encounter is conducted over a mutually trusted communications channel.

During operational use, users of personal identity devices can use them to collaborate with other device users as well as with identity services and service providers. E-credentials obtained from other users are retained by the identity engines.

FIG. 1 Depicting Scope of Electronic Identity and Credentialing System

Now referring to FIG. 1, FIG. 1 depicts the electronic identity and credentialing system 100 including users with personal identity devices 101 including smart phones 102, tablet computers 103, laptop computers 104, and personal computers 120. FIG. 1 also depicts service providers 105 and identity services 106, transaction flows between users and service providers 107, and transactions between users and identity services 108. Additionally, the figure illustrates an e-credential (electronic credential) requesting user 109 (a requester), holding personal identifying information 110, submitting an e-credential request 111 to an e-credential issuing user 112 (an issuer), who issues an e-credential 113 to the requester 109 by way of their smart phones 102. If the issuer is an agent of an identity service 116, the issuing agent sends a copy 115 of the issued electronic credential 113 to identity service 116.

Now referring to FIG. 2, FIG. 2 depicts a personal identity device and identity bindings 200 composing the system. Legend 270 of FIG. 2 depicts five (5) types of bindings: physical, knowledge-based, biometric, logical, and crypto-graphic (crypto-logical) bindings. The identity bindings among artifacts of the system provide assurances that e-credentials of the owner are strongly bound to the identity owner, and not to any other owner.

FIG. 2 depicts an owner 201 (a user), personal identity device 202 of the owner, personal identifying information 203 (e.g. utility bills, certificates, driver's licenses) in the custody 212 of owner 201, and communications interface 240 to other users with personal identity devices 101, to remote identity services 106, and to remote service providers 105. Personal identity device 202 is bound to the device owner 201 by way of physical custody 205 and authentication bindings 210 and 215 protecting against possible loss of custody 205. A personal identity device 202 also contains documents and messages 245. This figure additionally shows other users (issuers) 290 with e-credentials having affixed digital seals 291 to e-credentials 220 of the owner and digital seal 292 affixed to a document or message 245.

A personal identity device 202 has an identity engine 204 that holds e-credentials (electronic credentials) of the owner 220 and e-credentials of other users 230. Identity engine 204 controls a protected memory store 213 and possibly has a digital camera 207. Identity engine 204 specifies an e-credential of the owner 220 specified by owner 201 entering personal identifying information 203 captured 210 by way of user interface 206, by attaching self-photographs 208, and by attaching photographs 209 of the owner's personal identifying information 203. Certain embodiments may have a device identifier 260 and an identity engine identifier 265.

User interface 206 is also capable of performing knowledge-based authentication and storing knowledge-based authentication data 226, including PINs, passwords and PIN/password hashes, in the protected memory store 213. The personal identity device 202 possibly has a biometric module 211 performing biometric authentication, storing biometric authentication data 226, including finger print, iris, facial and other biometric minutia, in protected memory store 213. Authentication data 226 stored in protected memory store 213 is controlled (encapsulated) by identity engine 204.

By encapsulating the authentication data, the identity engine 204 logically binds the device owner 201 to the owner's e-credentials 220 controlled by identity engine 204:

(a) Identity engine 204 implements logical binding 216 to bind the device owner 201, via user interface 206, to the associated knowledge-based authentication data 226 in protected memory store 213. Owner 201 is thereby logically bound to their personal identity device 202, as well as by means of physical custody 205.

(b) If personal identity device 202 has biometric module 211 biometrically binding owners 201 to biometric module 211 and hence to personal identity device 202, identity engine 204 can employ logical binding 217 to bind biometric module 211 to associated biometric authentication data 226 in protected memory store 213. Owner 201 is thereby additionally bound to device 202 and identity engine 204.

(c) To detect possible loss of custody 205, identity engine 204 can use authentication control 219 to cause user interface 206 and biometric module 211 to re-authenticate the user thereby verifying that device owner 201 is persistently in control of their personal identity device 202.

If protected memory store 213 can be removed by device owner 201, owner 201 can physically break logical binding 216 thereby disabling authentication by means of user interface 206 and biometric module 211, disabling identity engine 204 and thereby preventing other users from masquerading as personal identity device owner 201. Owner 201 can subsequently re-enable their identity engine 204 by re-attaching protected memory store 213. When a removable memory store 213 is removable, it is called an "ignition key".

Associated with an e-credential of the owner 220 are three (3) public-private encryption key pairs, the pairs being crypto-logically bound 218 (see glossary) to each other, where the three (3) public keys 225 of each pair are embedded in the e-credential 220 of the owner, and the corresponding three (3) private keys 227 of each pair are embedded into removable memory store 213 controlled by identity engine 204. Legend 275 identifies the six (6) types (3 pairs) of public-private encryption keys associated with an e-credential. If protected memory store 213 is removable (is an "ignition key"), public-private key crypto-logical bindings 218 are broken when ignition key 213 is removed thereby disabling identity engine 204 and enabling owner 201 to have custody 214 of protected memory store 213 including contained secrets of owner 201, namely, authentication data 226 and private encryption keys 227.

By way of communications interface 240, identity engine 204 can provision e-credentials of the device owner 220 to other users 101, to identity services 106, and to service providers 105. When so provisioned, public keys 225 embedded in an e-credential of the owner 220 are available to other collaborating parties (users and services). The paired private keys 227 within protected memory store 213 are not revealed by the identity engine 204 of the owner to other users.

By way of communications interface 240, identity engine 204 can acquire e-credentials of other users 230, and from identity services 106. E-credentials of other users 230 have embedded public encryption keys 235. However, the private keys paired with public keys 235 are not disclosed by the personal identity devices 202 and contained identity engines 204 of other users 101.

Cryptographic operations, associated with the encryption keys of a selected e-credential 220 of an owner provided to other parties, are bound to device owner 201 as follows (see legend 275):

(a) Digital signing key s, a private key in 213 associated with e-credential 220 of the owner, can be used by identity engine 204 of owner 201 to calculate, by means of a prior art encryption algorithm, a digital signature over a message, document or e-credential. Because 216 and 217 logically bind s to owner 201, and because s is crypto-logically bound 218 to verification key v, a public key 225 embedded in e-credential 220, other parties having 220 can use verification key v to verify that the digital signature applied to the message, document or e-credential must have been originated by owner 201;

(b) Encryption key e, a public key embedded in e-credential 220 provided by owner 201, can be used by other parties, by means of a prior art encryption algorithm, to encrypt messages and documents sent to owner 201. Because the matching decryption key d, a private key 227 in 213, is logically bound by 216 and 217 to owner 201, and d is crypto-logically bound 218 to e, other parties having e-credential 220 can use e to encrypt electronic credentials, documents and messages that can only be decrypted by owner 201 thereby providing assurances that only owner 201 can read them;

(c) Embossing key ε, a private key in 213 associated with the e-credential of owner 201, can be used by the owner, by means of the present invention's digital sealing embossing and inspecting method (see FIG. 5), to calculate and render a digital seal, and affix a digital seal (291, 292, 294, 295) to an electronic credential, document or message. Because 216 and 217 logically bind ε to owner 201, and because ε is crypto-logically bound 218 to inspection key i (a public key 225 embedded in e-credential 220), other parties having e-credential 220 can use inspection key i to verify that the digital seal applied to the message, document or e-credential must have been created and affixed by owner 201.

FIG. 2 also illustrates other users 290, having personal identity devices and e-credentials, respectively affixing digital seals 291 and 292 to e-credentials 220 and an electronic document 245, thereby creating cryptographic bindings between the e-credentials of other users (issuers) 290 and e-credentials 220 of the owner, and documents and messages 245 contained in personal identity device 202 of owner 201. Described further in FIGS. 3, 4 and 5, a digital seal, by means of the embossing key ε of an e-credential of an owner, crypto-logically binds the identity of the owner, including an attestation (a declaration) specified by the owner, to an electronic artifact such that the owner cannot repudiate having affixed the digital seal to the attestation (declaration) and electronic artifact. Other parties can use the paired inspection key i of the e-credential to verify the digital seal. When another user 290 selects one of their e-credentials to create a digital seal, affixing the digital seal to an e-credential 220 of owner 201, the non-repudiation property of the affixed digital seal provides elevated assurances to other parties that the personal identifying information specified by e-credential 220 is that of owner 201, and not of some other e-credential owner.

Now referring to FIG. 3, FIG. 3 depicts collaboration among users with personal identity devices 300. FIG. 3 depicts three (3) personal identity devices of FIG. 2 collaborating with each other.

1) FIG. 3 depicts scenarios wherein three users 301, 302 and 303, have personal identity devices 202 with pre-installed identity engine 204, each user 301, 302 and 303 respectively having e-credentials $EC_n$, n=1, 2, 3 wherein $EC_n$, has embedded public keys $v_n$, $e_n$ and $i_n$ respectively paired with private keys $s_n$, $d_n$ and $\varepsilon_n$ retained in protected memory store 213. E-credentials, $EC_n$ n=1, 2, 3 are possibly digitally sealed.

2) During any given collaboration session, the identity engine of user 301 can request the identity engine of user 302 to re-authenticate user 302 by means of authentication control 219, returning a confirmation message to user 301 verifying that user 302 is persistently connected to the personal identity engine 204 of user 302.

3) Using their identity engines 204, users 301 and 302 establish a persistent secure session 390 as follows:
   a) Users 301 and 302 digitally sign $EC_1$ and $EC_2$ using $s_1$ and $s_2$ respectively, and exchange these signed e-credentials.
   b) Users 301 and 302 respectively apply $v_1$ and $v_2$ embedded in $EC_2$ and $EC_1$ to verify the digital signatures applied to each e-credential.
   c) If the digital signatures applied to $EC_1$ and $EC_2$ successfully verify under $v_1$ and $v_2$, users 301 and 302 can respectively apply $e_2$ of $EC_2$ and $e_1$ of $EC_1$ to encrypt messages sent to the other user, user 302 employing $d_2$ of $EC_2$ and user 301 using $d_1$ of $EC_1$ to decrypt received messages from users 301 and 302 respectively.
   d) Having executed 3) a), b) and c), users 301 and 302 have assurances that they are persistently bound to each other and are communicating over a secure channel. However, neither user can be certain that the identifying information specified in the credential provided by the other user actually represents that user, that is, the risk of user masquerade has not been eliminated.

4) E-credential issuer 302 attests to the identity of e-credential requester 301 over a persistent secure session 392. Users 301 and 302 use their identity engines 204, executing step 3 above, to exchange e-credentials $EC_1$ and $EC_2$, thereby establishing a persistent secure session 390. User 301 (the requester) acquires a digitally sealed e-credential from user 302 (the issuer) as follows:
   a) In addition to $EC_1$, requester 301 provides personal identifying information 203 to issuer 302. $EC_1$ may be unsealed or previously sealed with one or more (multiple) digital seals affixed.
   b) Issuer 302 proofs requester 301 against the provided personal identifying information 203 and the contents of $EC_1$, possibly asking probing questions, thereby verifying that $EC_1$ unambiguously represents the identity of requester 301. This is called "identity proofing".
   c) If requester 301 is successfully proofed, issuer 302 uses their identity engine 204 to affix a declaration (e.g. "proofed") to $EC_1$, uses embossing key $\varepsilon$ of $EC_2$ to create and affix a digital seal to $EC_1$, and returns newly sealed e-credential $EC_1$ to requester 301.

Having completed steps 4) a), b) and c), issuer 302 thereby attests to the identity of requester 301 which attestation issuers 302 cannot repudiate because the digital seal under embossing key $\varepsilon_2$ cryptographically binds the identity of issuer 302 to the identity of the requester 301.

5) Users 301 and 303 exchange and use e-credentials proofed and attested to by $3^{rd}$ parties to establish secure sessions 394. E-credential $EC_1$ of user 301 has been digitally sealed and issued by user 302 (per 392); and e-credential $EC_3$ of user 303 has been digitally sealed by the local bank manager, a notary public, of user 303. Users 301 and 303 are not known to each other and wish to establish a secure session between them. To achieve appropriate identity assurances, they employ their identity engines 204 to execute the following steps:
   a) Executing steps 3) a), b) and c), (see 390) users 301 and 303 use e-credentials $EC_1$ and $EC_3$ to establish a persistent secure session between them wherein neither user is initially certain that the identifying information specified in the credential provided by the other user actually represents the other user.
   b) However, users 301 and 303, by means of their identity engines, observe that e-credentials of the other user ($EC_1$ and $EC_3$) have been proofed and digitally sealed by $3^{rd}$ parties:
      i) User 301 uses $i_3$ of $EC_3$ to inspect and verify the digital seal applied to $EC_3$ and thereby becomes satisfied that the issuer (the bank manager) is sufficiently trusted to believe that the identity specified by $EC_3$ is that of user 303.
      ii) Similarly, user 303 uses $i_1$ of $EC_1$ to inspect and verify the digital seal applied to $EC_1$ and thereby becomes satisfied that issuer 302 is sufficiently trusted to believe that the identity specified by $EC_1$ is that of user 301.
   c) Given these assurances, users 301 and 303 can proceed with their session with assurances that they are communicating with a sufficiently qualified collaborator.

By way of steps 1 to 5, identity assurances are provided among collaborating parties whereby a user with a personal identity device: is persistently bound to their device and the digitally sealed and issued e-credentials contained therein; is able to determine that an e-credential provided by a remote user must have been originated by that user; can determine that messages originated under this e-credential cannot be repudiated; can verify that the originating user is the sole party capable of reading messages employing that e-credential. An e-credential owner can also affix digital seals to e-credentials, documents and messages that can be verified ("inspected") by other users wherein the user creating and affixing such seals cannot repudiate having digitally sealed them.

Now referring to FIG. 4, FIG. 4 depicts electronic credentials (e-credentials) and relationships 400 described at various levels of detail including: an e-credential 401 of an owner (a user), an e-credential template 450, a default e-credential of the subject owner 402, e-credentials of issuers 403, e-credentials of other users 404, and personal identifying information 405 of the owner. Depicted electronic credential 401 is an exemplar information structure for other credentials including e-credential template 450, default e-credential 402, e-credentials of issuers 403, and e-credentials of other users 404 (other users can also be issuers, for example, when users cross-issue e-credentials to each other).

Further, FIG. 4 depicts various relationships including the e-credential of the owner 401 referencing attached personal identifying information 405; e-credentials of issuers 403 having been used to create, affix and issue 406 digital seals 407 to e-credential 401; and e-credential 401 having been used to create, affix and issue 408 digital seals 409 to e-credentials of other users 404. Depicted default credential 402 represents a digitally self-sealed 410 e-credential that can be used to seal and issue e-credentials and electronic documents.

E-credential of the owner 401 has e-credential attributes 411 including an e-credential identifier, issue date, expiry date, and credential type, these elements specified when e-credential 401 was created. The e-credential additionally specifies attributes of the owner 412 including name(s) and identifier(s), distinguishing features (physical attributes of the subject owner), life events (e.g. birth, marriage, and divorce dates), endorsements, restrictions, and attached (personally) identifying information. For every digital seal 413 affixed to e-credential 401, an issuing record 414 is created by the issuer specifying the conditions under which the digital seal was created including: the encounter date(s); the types of encounters (in-person, online); the number of years that the subject has been known to the issuer; relevant certifications and qualifications of issuer (e.g. vetting and proofing experience, professional obligations, notarization qualifications); jurisdiction, policies and procedures applicable the issuing encounter; references to the documents that were proofed, if any; the attributes of the e-credential owner that were attested to by issuer 440; and attributes of the subject, if any, that were conferred upon the e-credential owner by issuer 441.

Every e-credential 401 issued also specifies a digital seal image 423 and is associated with three (3) public-private key pairs 416 where public keys 417 are embedded into e-credential 401, and where the paired private keys 418 are in protected memory store 213 of the owner's personal identity engine 202, said public-private key pairs including a signing-verification key pair used to create and verify digital signatures applied to documents and messages 442; an encryption-decryption key pair used to encrypt and decrypt documents and messages 443; and an embossing-inspection key pair used in conjunction with the digital seal image 423 where the embossing key is used to create digital seals 444, and the inspection key is used to verify digital seals 445.

Referring to FIG. 5, FIG. 5 depicts a method for handling digital seals 500 applied to electronic artifacts including e-credentials, documents and messages. Functions for affixing a digital seal 519 and inspecting a digital seal 520 are depicted. Affixing a digital seal 519 is comprised of a hash digest function 530, an emboss function 532 and an affix function 534. Inspecting a digital seal 520 is comprised of an extract function 540, an inspect function 541, a hash result function 542 and a compare function 543.

Affixing a digital seal 519 creates and affixes a digital seal to electronic artifact 501 by:
a) selecting an e-credential 521 of the owner and pre-determined attributes 522 of e-credential, including at least the e-credential identifier 517, the digital sealing image 523 and the private embossing key 525;
b) selecting pre-determined elements 526 of the electronic artifact 501, including at least the electronic artifact identifier 503;
c) the e-credential owner specifying an attestation 510 and issue date 512 characterizing the electronic artifact;
d) concatenating 510, 512, 522 (including at least 517), 523 and 526 (including at least 503) yielding digest 529;
e) using hash digest 530 to yield hashed digest 531;
f) using emboss 532 and the embossing key 525, a private encryption key, to encrypt the hashed digest 531 yielding digital seal signature 533;
g) using affix 534 to combine the digital sealing image 523, attestation 510, issue date 512, the e-credential identifier 517, electronic artifact identifier 503, and digital seal signature 533, rendering digital seal 528, and then affixing 528 to the electronic artifact 501 by using the electronic artifact identifier 503 to logically bind 505 the digital seal 528 to the electronic artifact 501;

Inspecting a digital seal 520 extracts and verifies digital seal 528 affixed to artifact 501 by:
a) using extract 540 to extract from digital seal 528, the attestation 510, the issue date 512, e-credential identifier 517, electronic artifact identifier 503, and digital seal signature 533, subsequently acquiring pre-determined identifying attributes 522, inspection key 524, and pre-determined elements 526;
b) concatenating 510, 512, 522, (including at least 517), 523, 526 (including at least 503), yielding result 544;
c) applying hash result 542 to result 544 yielding hashed result 545;
d) using inspect 541 and the inspection key 524 to decrypt the extracted digital seal signature 533 yielding expected hash 546; and
e) using compare 543 to match hashed result 545 to expected hash 546 indicating "digital seal verified" 547 if 545 and 546 matches, else indicating "digital seal failed to verify" 548 if 545 and 546 do not match.

Referring to FIG. 6, FIG. 6 depicts a usage scenario illustrating the issuing of a true copy e-credential of a physical credential 600 such as a driver's license. E-credential requester 601 uses their personal identity device 202 to take 602 a digital photograph 603 of a physical credential 604 (e.g. requester's driver's license). By means of the requester's personal identity device 202, requester 601 prepares an e-credential request 605 by populating an e-credential template 450 and attaching digital photograph 603 to request 605. By means of a mutually trusted channel 606 submits request 605 to the personal identity device 202 of a e-credential issuer 607. By means of an in-person or online encounter, issuer 607 performs identity proofing 608 of recipient 601 with respect to the submitted e-credential request 605 and the attached digital photograph 603 of physical credential 604, and other personal identifying information that may be required. Finally, upon successful identity proofing, issuer 607, by means of the issuer's personal identity device 204, issues a true copy e-credential 609 of physical credential 604 to the personal credentialing device 202 of the requester 601, and writes a copy of the true copy e-credential 609 and a transaction record 610 to an e-credential registry 611.

Referring to FIG. 7, FIG. 7 depicts a usage scenario illustrating the issuing of a true copy self-photograph e-credential 700, for example, one associated with other personal identifying information to create an electronic business card. The e-credential requester 701 uses their personal identity device 202 to take 702 a digital self-photograph 704. By means of the requester's personal identity device 202, requester 701 prepares an e-credential request 703 by populating an e-credential template 450 and attaching the digital self-photograph 704 to request 703. By means of a mutually trusted channel 705, requester 701 submits request 703 with attached digital self-photograph to the personal identity device 202 of e-credential issuer 706. By means of in-person or online encounter, issuer 706 performs identity proofing 707 of recipient 701 with respect to submitted e-credential request 703, the attached self-photograph 704, and other personal identifying information that may be required. Finally, upon successful identity proofing, issuer 706, by means of the issuer's personal identity device 202 and the mutually trusted channel 705, issues a true copy self-photograph e-credential 709 to the personal identity device 202 of requester 701, and writes the true copy self-photograph e-credential 709 and a transaction record 710 to e-credential registry 711.

Referring to FIG. 8, FIG. 8 depicts a usage scenario illustrating the issuing of an original electronic credential (e-credential). The e-credential requester 801 uses their personal identity device 202 to populate an e-credential template 450 to prepare an e-credential request 802. By means of mutually trusted channel 803, requester 801 submits request 802, possibly attaching other relevant personal identifying information, to issuer 804 by way of the issuer's personal identity device 202. By means of an in-person or online identity encounter, issuer 804 performs identity proofing 805 of requester 801 with respect to the submitted request 802, other personal identifying information that may be attached including physical credentials 806 that may be required, and personal identifying information that may be retrieved from the issuer's e-credential registry 807. Upon successful identity proofing, issuer 804 uses their personal identity device 202 to take a digital photograph 808 of requester 801, attaches the digital photograph to the submitted e-credential request 802, digitally seals e-credential request 802 thereby creating new e-credential 809. Finally, issuer 804, by means of the issuer's personal identity device 202 and mutually trusted channel 803, sends digitally sealed e-credential 809 to the personal credentialing device 202 of requester 801, and writes a copy of e-credential 809 and transaction record 811 to e-credential registry 807.

Referring to FIG. 9, FIG. 9 depicting alternate embodiments 900, includes a user 920, a smart phone 901, a tablet computer 902, a laptop computer 903, and a personal computer 904. Persons skilled in the art will recognize that many hardware and software variations, configurations and deployments of the inventive subject matter are possible. For example, various biometric mechanisms, digital camera configurations, and operating systems may be configured for any given personal identity device.

FIG. 9 also depicts possible future embodiments that could be developed and integrated to support the installation and deployment of the inventive subject matter including a smart card 905, a smart ring 906, a smart watch 907, and smart glasses 908. For example, instead of being maintained within a single personal credentialing device 202 (e.g. smart phone 901), the user's e-credentials 909 with embedded public keys, paired with private keys 912 in protected memory store 911 could be otherwise deployed. FIG. 9 depicts user 920 having a smart phone 901 communicating over pre-configured trusted communication channels 910 with a smart card 905 or a smart ring 906 with embedded protected memory store 911 containing private keys and secrets 912 of user 920. FIG. 9 also depicts a smart watch 907 containing e-credentials 909 of user including embedded public keys. Smart glasses 908 could be similarly created and integrated with a smart phone 901. For example, the smart glasses 908 could (i) retrieve private keys 912 from the smart ring 906, (ii) read an encrypted page into the smart glasses 908, (iii) decrypt the page; and (iv) render the decrypted page in plain text on the inner surface of the smart glasses 908 for user 920 to read. Such an embodiment avoids decryption of documents within the user's personal identity device, thereby decreasing the risk of document tampering. Another embodiment would be for e-credentials of the user 909 and private keys 912 to be maintained in smart card 905 communicating with the user's smart phone 901. Those skilled in the art will recognize that segmenting the artifacts of the inventive subject matter among distinct hardware devices reduces identity theft risk.

Referring to FIG. 10, FIG. 10 depicts the potential scope of electronic identity and credentialing usage 1000. This figure shows user 1001 holding a personal identity device 204 containing a group of electronic credentials 1003 to 1013 issued to user 1001. This figure also shows representative credential issuers 1002 holding personal credentialing devices who have issued electronic credentials to user 1001. Grouping 1020 represents individual users who can issue simple e-credentials to user 1001 such as true copy photographs 1003. Grouping 1022 represents individual users with elevated qualifications and obligations sufficient, for example, to issue certified true copies of driver's licenses. Grouping 1021 represents organizations and networks without credential issuing agents that nevertheless accept electronic credentials 1003, 1004 and 1007. Groupings 1023 to 1028 represent institutions and organizations having credentialing agents (authorities) charged with issuing e-credentials to employees, customers and the public. The example of departments of motor vehicles (DMVs) 1025 illustrates wide dissemination and usage of electronic driver's licenses across most groupings. Grouping 1029 represents e-business merchants and suppliers who mainly leverage electronic credentials issued by the credential issuers of the other groupings.

Now referring to FIG. 11, FIG. 11 depicts a physical credentialing, prior art PKI and PGP technologies, and e-credentialing system 1100. FIG. 11A depicts a physical credentialing system; FIG. 11B depicts prior art Public Key Infrastructure (PKI); FIG. 11C depicts prior art Pretty Good Privacy (PGP); and FIG. 11D depicts the inventive subject matter, an electronic identity and credentialing system.

FIG. 11A depicts a physical credentialing system 1100 illustrating the range of identifying attributes 1101 of a person mapped to physical credentials 1102 and other personal identifying information 1103 of a user 1104. When requesting physical credential 1105, the user 1104, submits their existing physical credential(s) 1102 and other identifying information 1103 to an agent 1106 of the credential issuing organization, together with a credential request 1107 (a completed application form) specifying selected identifying attributes 1101 of the user to the agent 1106. The agent 1106 proofs the provided information, issues 1108 credential 1105 to the user 1104, and writes transaction record 1109 into the credential registry 1110.

FIG. 11B depicts a Public Key Infrastructure (PKI) usage scenario wherein a certificate authority (C) 1120, an identity provider, possesses a signed (digital) certificate 1121 with public key $q_c$, matching private key $p_c$, with digital signature $ds_r$ signed and issued by root certificate authority 1122. In response to a certificate request 1123 from user X 1124, certificate authority (C) 1120 generates, signs, and issues 1126 to user 1124 a signed (digital) certificate (name=X)

1125 with public key $q_x$, private key $p_x$, and digital signature $ds_c$ calculated using signed digital certificate 1121 of certificate authority 1120.

FIG. 11C depicts a Pretty Good Privacy (PGP) usage scenario where user A 1140 requests user B 1141 to digitally sign and return user A's digital certificate. Initially, using installed PGP software, user A creates an unsigned digital certificate (name=A) 1142 containing public key $q_a$ paired with private key $p_a$ stored outside the context of certificate 1142. User B similarly creates an unsigned digital certificate (name=A) 1143 containing public key $q_b$ paired with private key $p_b$ stored outside the context of certificate 1143. On an ad hoc basis, user A and user B agree to exchange digital certificates, for example, by secure email using pre-determined symmetric encryption keys. User A sends unsigned digital certificate 1144 to user B (private key $p_a$ is not sent to user B) requesting user B to digitally sign user A's digital certificate. User B, upon receiving user A's digital certificate 1144, uses user B's private key $p_b$ to digitally sign user A's digital certificate 1144, calculating and affixing digital signature $ds_b$ to user A's digital certificate and subsequently sending the signed digital certificate 1145 to user A. The PGP software finally associates 1146 private $p_a$ with the newly signed digital certificate 1147.

FIG. 11D depicts a usage scenario of the present invention, namely, an electronic identity and credentialing system. This figure illustrates user A 1160, user B 1161 and user C 1162 using their respective personal identity devices 1163, 1164, 1165 to request and issue an e-credential for user A, wherein user A requests an e-credential, and both user B and user C issue a new e-credential to user A following a round-robin issuing process 1166→1167→1168. After installation and setup, the personal identity devices of users A, B and C each contain a self-sealed default e-credential 1169 with digital sealing image, public keys, and associated private keys (FIG. 11D only depicts the default e-credential 1169 of user A). User A completes an e-credential request 1170 initialized with digital sealing image, public keys, and associated private keys, specifying selected attributes of the user, possibly attaching other personal identifying information, and then selecting default credential 1169 to digitally seal 1171 e-credential request 1170. User A subsequently sends (1166) the e-credential request 1172 (not including private keys) to user B. User B verifies digital seal 1171 of e-credential request 1170, proofs user A against the contents of e-credential request 1170, and if verified, calculates and affixes digital seal (dŝ$_b$) to e-credential request 1170. User B then forwards (1167) the partially sealed and issued e-credential, to user C who follows the same proofing and verification steps as user B, affixing a digital seal (dŝ$_c$) and issuing (1168), now doubly sealed e-credential 1173, to user A. Upon receiving newly issued e-credential 1173, the original e-credential request is replaced by the newly created e-credential, digitally sealed by a selected e-credential of the requester (e.g. default credential 1169) (thereby becoming triply sealed 1171), and the private keys originally associated with the e-credential request are re-associated with the newly issued e-credential 1174.

Referring to FIG. 12, FIG. 12 is a diagram that depicts selected scenarios illustrating the registration and acquisition of e-credentials by owners of personal identity devices, each device having an identity engine containing e-credentials of the owner and e-credentials of other owners.

As depicted, owners use their personal identity devices to interoperate with each other as well as with an identity registry system. The identity registry system is used by owners to register and verify their e-credentials and the e-credentials of other owners. Owners register their own e-credentials when they have created and updated them. Owners can use the identity registry system when they need to verify the veracity of an e-credential, for example when presented, receiving, or otherwise acquiring an e-credential. They can also register the e-credentials of other owners when they have been asked to proof, attest and issue an e-credential to the requesting owner.

FIG. 12 has broken down this method for registering and acquiring e-credentials 1200 into five groupings of operations and transactions, namely, a first device owner registering an e-credential 1240, a second owner registering an e-credential 1250, the first owner verifying a registration 1260, the second owner verifying a registration 1270, and the first owner acquiring an e-credential from the second owner, the first and second owners respectively requesting and issuing an e-credential 1280.

Now referring more specifically, the first device owner 1201 (subsequently assuming the role of an e-credential requester), has a personal identity device 202 having an identity engine 204, an e-credential 1210, and personally identifying information 1218; and the second device owner 1202 (subsequently assuming the role of an e-credential issuer) has a personal identity device 202 having an identity engine 204, and an e-credential 1220. Said owner 1202 subsequently acquires e-credential 1210-2 denoting e-credential 1210 of owner 1201 with a digital seal affixed using e-credential 1220 of second owner 1202.

Identity registry system 1205 depicts identifying thumbprints 1206 of e-credentials stored in the memory of identity registry system 1205. An identifying thumbprint stored in the memory of said identity registry system provides objective evidence that an e-credential of an owner was registered without revealing personally identifying information of the e-credential owner. Thumbprint 1211-1 is created when e-credential 1210 of first owner 1201 is registered by first owner 1201. Thumbprint 1212-2 is created when e-credential 1210-2, the e-credential of first owner 1201 with a digital seal affixed using e-credential 1220 of second owner 1202, is registered by second owner 1202.

Registering an e-credential 1240 depicts first owner 1201 registering e-credential 1210: hashing at least the identifier and public encryption keys of e-credential 1210 by means of hashing 1242 yielding hash 1211; by means of affixing a digital seal 1244 and e-credential 1210 affixing a digital seal to hash 1211 yielding identifying thumbprint 1211-1; and by means of store identifying thumbprint 1248 instructing identity registry 1205 to store identifying thumbprint 1211-1 in the memory location of the identity registry system specified by hash 1211, first owner 1201 thereby registering e-credential 1210 of first owner 1201 in identity registry system 1205.

Verifying a registration 1270 depicts second owner 1202 verifying the registration of e-credential 1210 acquired from first owner 1201: using hashing 1271 to hash at least the identifier and public encryption keys of e-credential 1210 yielding hash 1211; by means of fetch identifying thumbprint 1272 instructing identity registry system 1205 to fetch the contents of the memory location specified by hash 1211 returning either thumbprint not found 1273 to owner 1202 or returning thumbprint found 1274 including identifying thumbprint 1211-1 to owner 1202; and by means of inspecting a digital seal 1275 and using e-credential 1210, verifying the digital seal affixed to identifying thumbprint 1211-1, terminating if said digital seal fails to verify 1278, and indicating that e-credential 1210 was successfully registered if said digital seal verifies 1279, second owner 1202 thereby verifying the registration of e-credential 1210 by first owner 1201 in identity registry system 1205.

Requesting and issuing an e-credential 1280 depicts: first owner 1201, the requester, sending an e-credential request 1281 to second owner 1202, the issuer, including e-credential 1210 and personally identifying information 1218 of requester 1201; issuer 1202, by means of verifying a registration 1270, using e-credential 1210 and fetch identifying thumbprint 1282, retrieving identifying thumbprint 1211-1 from identity registry system 1205; sending fail to verify notification 1284 to requester 1201 and terminating if identifying thumbprint 1211-1 is not found or fails to verify 1283; else if registration verifies 1285, by means of identity proofing 1286, using e-credential 1210 and the personally identifying information 1218 of requester 1201, proofing the identity of requester 1201; sending fail to proof notification 1288 to requester 1201 and terminating if proofing fails 1287; if successfully proofed 1289, affixing a digital seal 1290 to e-credential 1210 using e-credential 1220 of issuer 1202, yielding digitally sealed e-credential 1210-2; by means of registering an e-credential 1250 yielding identifying thumbprint 1212-2 of e-credential 1210-2; registering e-credential 1210-2 by means of store identifying thumbprint 1291 instructing identity registry system 1205 to store identifying thumbnail 1212-2; and, finally, by means of e-credential issued 1294 sending e-credential 1210-2 to first owner 1201, the requester, owner 1201 thereby acquiring e-credential 1210-2 from second owner 1202, the issuer.

Registering an e-credential 1250 depicts second owner 1202 registering digitally sealed e-credential 1210-2 of first owner 1201, the requester: hashing at least the identifier and public encryption keys of e-credential 1210-2 by means of hashing 1252 yielding hash 1212; by means of affixing a digital seal 1254 and e-credential 1220 affixing a digital seal to hash 1212 yielding identifying thumbprint 1212-2; and by means of store identifying thumbprint 1258 instructing identity registry system 1205 to store identifying thumbprint 1212-2 in the memory location of the identity registry system specified by hash 1212; second owner 1202, the issuer, thereby registering e-credential 1210-2 of first owner 1201, the requester, in identity registry system 1205.

Verifying a registration 1260 depicts owner 1201 verifying the registration of e-credential 1210-2 of owner 1201 acquired from second owner 1202 having been digitally sealed by second owner 1202 using e-credential 1220: using hashing 1261 to hash at least the identifier and public encryption keys of e-credential 1210-2 yielding hash 1212; by means of fetch identifying thumbprint 1262 instructing identity registry system 1205 to fetch the contents of the memory location specified by hash 1212 to fetch identifying thumbprint 1212-2 returning either thumbprint not found 1263 to owner 1201 or returning thumbprint found 1264 including identifying thumbprint 1212-2 to owner 1201; and by means of inspecting a digital seal 1265 and using e-credential 1220, verifying the digital seal affixed to identifying thumbprint 1212-2, terminating if said digital seal fails to verify 1268, and indicating that e-credential 1210-2 was successfully registered if said digital seal verifies 1269; first owner 1201, the requester, thereby verifying the registration of e-credential 1210-2 by second owner 1202, the issuer, in identity registry system 1205.

The present invention provides several improvements and advantages over prior art PKI and PGP identity systems including:

(a) Private keys are never revealed outside the context of the user's personal identity device, while PKI certificate authorities allow the distribution of private keys over networks;

(b) Supports e-credentials that can contain a range of personal identifying information while PKI and PGP digital certificates can specify only names and identifiers;

(c) Enables an e-credential owner to be crypto-logically bound to their e-credential by three (3) encryption key pairs while PKI and PGP digital certificates specify only a single key pair;

(d) E-credentials support three (3) public-private key pairs used for distinct purposes while PKI and PGP digital certificates allow sharing a single encryption key across multiple applications;

(e) By means of digital sealing, an e-credential issuer cannot repudiate having issued an e-credential. Digital signatures applied to PKI and PGP digital certificates can be repudiated;

(f) An owner's personal identity device logically binds the owner's authentication data to their e-credentials and hence to the owner. PKI and PGP do not support such binding mechanisms;

(g) The present invention supports $3^{rd}$ party attestation of e-credentials among device owners. PKI provides only server-centric attestations;

(h) Provides a mechanism for personalizing and visualizing a digital seal applied to e-credentials, documents and messages. PKI and PGP do not specify such mechanisms.

(i) Owners of personal identity devices can verify the veracity of e-credentials when acquired by means of an identity registry system to ensure they were not tampered with or otherwise modified in transit while also ensuring that the identity registry system does not reveal personally identifying information.

Disadvantages (a) Personal identity devices are not normally shared while desktops and laptops are commonly shared. Tablet computers and smart phones are less likely to be shared. Given the risks of sharing, personal identity devices should not be shared.

(b) The present invention does not describe how the system will be integrated with identity services and service providers, or how the inventive subject matter can be transitioned from prior art identity systems such as public key infrastructure-based systems. These tasks are left to others to solve.

(c) The inventive subject matter is more complex than the cited relevant prior art. Although the additional effort required for deployment and operation may appear to be a disadvantage, it is believed that the benefits of reduced identity theft and electronic fraud will off-set this apparent disadvantage.

During the discovery effort, several meaningful insights into electronic identity and credentialing emerged, leading to unanticipated discoveries and novel features that enhanced the utility of the present invention. For example, the initial phase of the discovery process did not anticipate the potential of digital cameras embedded into a user's personal identity device. Nor did it consider applying some of the practices of notary publics when proofing personal identifying information.

Digital Sealing Method: Notary practices stimulated the discovery of the present invention's method for digitally applying seals to e-credentials and other electronic documents. The notary's process suggested a powerful technical solution that can also be rendered programmatically. This discovery process began by observing that a notary public, after proofing a document, uses their embosser (a stamping device) to impress their seal onto documents to be notarized. The purpose of the seal is to detect tampering with both the document and the seal itself. The notary's impressed seal is also useful to trace the proofing and sealing event back to the notary's registry. This manual process motivated the creation of the present invention's digital sealing method whereby the issuer's embossing key is used to create a digital seal signature that cryptographically binds and protects both the sealed document and the seal, containing selected attributes of the issuer, against tampering. The inspection key, a public key paired with the embossing key, is used to verify the digital seal signature to detect both tampering with the seal and the document. Because these keys are bound to the e-credentials of the owner, an issuer using their embossing key when digitally sealing a document, cannot repudiate having applied this key, and hence the seal.

Personalized Digital Seals: It was observed that a notary's seal includes a commission number, expiry date, jurisdiction, and possibly other identifying attributes of the notary. Furthermore, because notary is licensed by a given jurisdiction, seals often incorporate images such as state animals, flowers, landmarks. This motivated the idea of personalizing digital seals by enabling the specification of a "sealing image" [e.g. a jpg or bitmap] for every credential. Furthermore, the digital sealing process was enhanced by including the sealing image in the calculation of the digital seal signature, thereby protecting the seal image as well as the document and the contents of the seal, containing selected attributes of the issuer, from tampering. This technical feature enables visualization improvement opportunities. For example, software renderings of a cryptographically bound sealing image (e.g. photos, logos, written signatures), if tampered with, could be rendered with a strong warning and prevent certain operations that might put the user at risk.

Notaries and Integrated Digital Cameras: Examining the best practices of Notary Publics combined with the photographic capabilities of mobile computing devices stimulated unanticipated new types of electronic credentials that exploit front-facing and forward-facing cameras. It was derived from the process of certifying true copies of legal documents [e.g. birth certificates and citizenship papers] and application of the notary's embosser to impress the notary's seal onto the document.

Certified True Copy E-Credentials: This refinement of the present invention involves the application of the forward-facing camera of a mobile device: taking a digital photograph of a physical credential [e.g. a driver's license]; creating and completing a credential template; attaching the photograph to the template; and submitting a new e-credential request to the issuer's personal identity device. Upon successful proofing of the physical credential and the attached photograph, the issuer creates a new e-credential and attaches the photograph to the new e-credential by way of the user's personal identity device. Finally, the issuer selects an embossing key to digitally seal both the new credential and the attached photograph, remitting this "certified true copy e-credential" to the user.

Certified True Translation Credentials: The above true copy example stimulated the idea of creating additional types of true copy variants by means of the forward-facing camera including true copy translations of birth certificates written in other languages.

Certified True Copy Photographs: The above examples stimulated additional refinements. In the first case the user takes a digital self-portrait using the front-facing camera; attaches the photograph to the new credential request; and the issuer returns a digitally sealed certified true copy credential with the attached photograph also digitally sealed. The second case involves a photograph being taken by the issuer's forward-facing camera and returning the sealed credential and sealed photograph.

Identity Proofing with Multi-Media Conferencing: The potential application of multi-media conferencing, using cameras and audio, was not anticipated until the identity assurance implications of in-person and known-person identity proofing became fully appreciated:

a) For in-person identity proofing, the person requesting an e-credential person need not be known to the e-credential issuer. However, personal identifying information, including at least one physical credential (e.g. a driver's license), should be required;

b) For known-person identity proofing where the requester and issuer have known each other personally for a prescribed period of time (e.g. 2 or more years), personal identifying information may not be deemed to be necessary;

c) Under both in-person and known-person identity proofing scenarios, depending on the level of perceived risk, it may be advisable for the collaborating users to establish a mutually trusted channel between their personal identity devices.

d) When e-credentialing over an online application (like video conferencing), depending on the perceived risk, it may be acceptable for collaborating users to exchange a one-time secret over an alternate channel, and use that secret to create a shared symmetric encryption key to establish the mutually trusted channel.

The self-sovereign digital identity architecture installs intelligent software agents on personal devices collaborating on behalf of their owners. Owners can specify and tightly control their digital identities to identify themselves; verify digital identities; proof, attest and issue identities; register and verify them using an identity registry; notarize documents; reliably transfer identities; and securely collaborate. The digital identities are said to be "self-sovereign" because owners control them throughout their useful lives from when they are created, to when they are deleted or retired.

The architecture for self-sovereign identity adopts and adapts selected properties of X.509 digital certificates employed by PKI and PGP identity systems. Such certificates have a single key-pair and specify information characterizing the associated web service(s), the Internet domain, and the issuing authority, rather than that of individual persons.

The identity model enables device owners to create multiple rich personas, that is, digital identities that specify selected information and images characterizing the owner. Certain features have been modified to enhance cryptographic strength. The model allocates one or more public/private key-pairs to each digital identity for signing and encrypting transactions and for creating digital seals used to bind the identities and attestations of owners to digital identities and other electronic artifacts. A given digital identity can be digitally sealed by multiple owners.

The owner maintains control over the sovereign images of her digital identities by means of the identity engine. Only the owner can use her identity engine to create, store, access, update, expire, delete, and use her digital identities. The owner is authenticated locally. And she can instruct her identity engine to select one of her digital identities, and a digital identity of another party, to establish a secure session with the identity engine of that other party.

In support of asynchronous collaboration (e.g. messaging services like email), the architecture incorporates a capability for registering digital identities to enable relying parties to verify acquired digital identities. This mechanism combines the digital sealing method with a proof-of-existence method popularized by blockchain. The identity registry can be made publicly available because only hashes of registered digital identities are stored, rendering the identity registry immune to breaches.

To facilitate user buy-in and adoption, the identity architecture also mimics identity processes used in the physical world. Third party identity-proofing and attestation is used to provide assurances that a digital identity truthfully characterizes the owner rather than some other party. The identity engine enables owners to conduct identity proofing in-person or online when the channel is adequately trusted. If successfully proofed, the issuer selects one of her digital identities to create a digital seal that affixes her identity and an attestation (e.g. "proofed") to the requester's digital identity, registers the attested digital identity, and issues the attested digital identity to the requester. Upon receiving the attested digital identity, the requester acknowledges receipt and registers his attested identity. Identity assurances are elevated for the requester because the issuer cannot repudiate having affixed the attestation to the requester's identity. Multiple parties can attest, digitally seal, and issue digital identities for an owner. Such multiple-attestation incrementally elevates identity assurances associated with an owner's digital identities.

The identity engines of owners can be used to reliably transfer digital identities online by employing the identity registry to verify that they were not corrupted in transit—a reasonable strategy when the risks of a man-in-the-middle attack are low. Collaborating parties can also use their identity engines to securely transfer digital identities by way of in-person encounters using NFC, Bluetooth, WiFi, QR codes, thumb drives, and USB cable.

When owners cannot meet in-person, and online transacting is risky, one of the above techniques can be used to reliably exchange low sensitivity digital identities, subsequently using them to transfer more sensitive digital identities. Another approach is for owners to use their identity engines to exchange a one-time-password or passphrase (OTP) out-of-band (e.g. text, email, or voice), deriving a shared symmetric key which can be used to secure the transfer of the sensitive digital identity.

Below we describe two additional methods that can be used to exchange digital identities:
1. Using legacy password-based login to exchange digital identities where web service providers have established acceptable identity assurances with their users; and
2. Combining the Diffie-Hellman key exchange method with an HTTPS identity service where collaborators rely on mutually exchanged handles or codes.

Once collaborators have securely exchanged their digital identities, their identity engines can use designated public-private key-pairs of their digital identities to secure their transactions, end-to-end, thereby thwarting man-in-the-middle attacks.

Referring to FIG. 13, the core characteristics of digital identity 1300 are described. Users hold virtualized digital identities within their personal devices controlled by means of password/PIN and/or biometric authentication. A device and digital identity owner 1310 can specify his/her identities and request other parties (issuers) to proof and attest them to elevate identity assurances associated with the owner's digital identities 1311. One or more attestations can be affixed using digital seals 1312 by different parties. Both owners and attesting third-party issuers can register digital identities in a hashed "proof-of-existence" identity registry 1320—possibly a distributed ledger system (blockchain). Relying parties 1350 can verify digital identities synchronously 1330, directly with owners; and/or asynchronously 1340 by way of the identity registry. Registered identities are stored in the form of hashed records rendering the identity registry immune to breaches. Digital identities can also be used to create self-sovereign consent tokens and enabling relying parties secure access to the resources of owners held by web services known as resource custodians.

Now referring to FIG. 14, self-sovereign digital identity ensures that user interfaces are familiar, unambiguous, and easy-to-use. Users specify virtualized digital identities using an identity data model 1420 that combines selected characterizing images (photos, logos) and "claims" (attributes) as depicted 1400.

Collaborators can visually inspect and intuitively select their own virtualized identities 1450 from their wallets 1430 to identify themselves, and the virtualized identities of collaborating users and services 1460 from their rolodex of contacts 1440. They can be used to attest and digitally seal 1480 digital identities, transactions, messages, and consent tokens 1470, verify the veracity of such attestations and digital seals 1490, and secure transactions while preventing impersonation.

Self-sovereign digital identities of owners are potentially operable across a full range of use cases 1499 among owners as well as between owners and online web services including consumer-to-consumer collaboration (email, messaging and conferencing); online access (social, business, enterprise, government, and e-commerce services); and anonymous posting (bulletin boards, blogs, and survey sites).

Self-sovereignty (control) over digital identities is accomplished by designing-in a range of identity assurances. FIG. 15 depicts fourteen (14) design properties for self-sovereign digital identity derived from our research. We have applied these properties to the development of our identity architecture including the design of intelligent software-based agents we have called "identity engines" 1530, and the identity layer described in FIG. 16.

Scheme 1500 illustrates users 1510 having personal devices 1515, and administrators 1520 managing services and servers 1525 employing the design features of their identity engines 1530, including an encryption libraries to create and use digital identities 1580. The identity data model enables users and administrators to intuitively create, use and retire digital identities that can be stored and safely ported for the purposes of backup, recovery, and escrow. Multiple public/private encryption key-pairs are bound to each digital identity to enable counterfeit prevention. The owner's identity engine does not disclose private keys. Only public keys of an owner's digital identity are disclosed to collaborators. The encryption keys bound to each digital identity are used to digitally sign, encrypt, and digitally seal electronic artifacts.

Owners can control what private data is disclosed, and can provide consent to access their resources. They can also use their identity engines to proof and attest the identities of collaborating parties. For example, an owner can create a digital seal that cryptographically and virtually affixes her identity and attestation to a selected electronic artifact such as a digital identity, registry record, transaction, message, or consent token. Other parties can inspect and cryptographically verify the veracity of such digital identities.

In addition, an owner can use her identity engine to verify digital identities by executing "proof-of-possession", "proof-of-custody", and "proof-of-existence" tests; securely transfer digital identities among collaborating parties by way of wireless channels, digital media, one-time-passwords, and our adaptation of the Diffie-Hellman key exchange protocol; and use the public and private encryption keys of digital identities to secure transactions.

FIG. 16 reminds us that the Web 1690 is crucially missing an identity layer for reliably connecting collaborating parties. 1600 describes a consistent, reliable and interoperable model for the identity layer with standard interfaces and services between the applications services layer 1610 and the transport layer 1650. It is acknowledged that creating such a standard, or standards, will require the application of considerable effort, stakeholder consensus, and time.

FIG. 16 depicts interoperability scheme 1600 implemented by the identity layer to coordinate device owners 1310 and their collaborating personal devices 1515 accessing application services 1610. The identity engine 1530 holds his/her digital wallets 1430 and contacts 1440. It also encapsulates the owner's authentication data 1615 captured when the owner uses the authenticator(s) to enroll (e.g biometrics), and an event logger 1620 for tracking and accountability. The integrative identity layer 1640 between the application service layer 1630 and the transport layer 1650 enables the construction of consistent application programming interfaces supporting collaborative application services 1620 such as text messaging, email, conferencing and web browsing. When launching a collaborative application, the personal device owner 1310 uses her identity engine 1530 to select one of her digital identities in her wallet 1430, and one from her contact rolodex 1440 to connect with the relying party (e.g. another owner, or an online web service).

FIG. 17 describes how the architecture for self-sovereign digital identity achieves elevated authentication, identity verification, and identity assurances 1700. Digital identities are tightly controlled by their owners using their personal device(s), including smart phones, tablets, and laptops, each device having a pre-installed identity engine 1530. When an owner uses his identity engine 1530 to specify a digital identity, a sovereign image 1725 is created specifying claims, attributes and images that characterize the owner. Instead of entering account names and passwords, users select and present their digital identities to relying parties to identify themselves. Once collaborating parties have reliably exchanged their digital identities they can use them to collaborate securely. Transactions are bilaterally signed and encrypted to thwart phishing, pharming and other impersonation attacks.

FIG. 17 also depicts the identity engine controlling the owner's authentication data used by the device's authenticators to enroll and authenticate the device owner. The identity engine 1530 provides a dedicated conduit between native and/or external authenticators 1605 and the authentication data 1615 encapsulated by the identity engine 1530; protects this critical data from tampering; and does not reveal this data outside the context of the identity engine 1530. The owner's digital identities, including the owner's authentication data, are thereby strongly bound to the owner and protected from misuse, malware, and surveillance. The strength of binding depends on the combination of factors used to locally authenticate the owner.

To thwart the creation of counterfeit (bogus) digital identities, multiple public/private key-pairs 1799 are designated for distinct purposes to elevate resistance to cryptographic attack. When the owner specifies a new digital identity, her identity engine creates a master copy of the digital identity called the sovereign image 1725 which can include multiple public/private key-pairs as illustrated. Private (secret) keys are vaulted by the owner's identity engine to protect them from disclosure and tampering by concurrent, and potentially malevolent, software. When the owner selects and presents one of her digital identities to a relying party, the identity engine does not reveal the private keys, delivering only a public copy of the digital identity. In other words, relying party 1729 receives only the public keys associated with a presented digital identity.

Depending on the context, risks, number and length of keys, and encryption method(s) used, determining the private encryption key from the paired public encryption key can be a hard-mathematical problem to solve. If a malicious party captures the public copy of a digital identity, it is therefore infeasible for that party to discover the private key(s) from the public key(s) to create counterfeits. Nevertheless, a relying party can use the public keys to challenge an originating owner to determine whether the owner possesses the matching private keys.

When establishing a synchronous (interactive) session, collaborating owners play both originating and relying roles. As illustrated in scheme 1700 of FIG. 17, once an originator has presented the public copy of her digital identity 1735 to a relying party 1729, the identity engine 1530 of the relying party can check the veracity of the presented digital identity, and obtain proof that the originator controls the associated sovereign image.

To accomplish this, the relying party's identity engine can use designated public key of the presented digital identity to execute a proof-of-possession 1755 challenge which can only be satisfied by the paired private key of the originator's sovereign image. Executed bilaterally, these tests determine whether collaborators' identity engines control the matching private keys and hence the associated digital identities.

If successful, the identity engine of the relying party can send a demand to the identity engine of the originating owner's identity engine to authenticate the holder and send a proof-of-custody 1760 indication to the relying party's identity engine. Used in combination, these tests determine whether collaborators control their digital identities before using their digital identities to sign and encrypt transactions 1770.

Once both parties have identified themselves and have successfully confirmed that the other party has custody of the presented digital identity, neither party can repudiate (deny) having participated in the collaborative session.

A relying party 1729 can also verify the digital seals and attestations affixed to a digital identity to determine the assurances associated with the collaborator. FIG. 17 depicts two collaborators, 1780 and 1785, who have attested and sealed 1765 the digital identity 1725 of owner 1310. Relying party 1729 can acquire and apply the public copies of collaborators 1780 and 1785 to verify the affixed seals.

Observe also that all of the depicted parties can use identity registry 1320 to asynchronously verify acquired digital identities 1790 to counter impersonation and other attacks. FIG. 17 also depicts collaborator 1780 and owner 1310 having used their digital seals to notarize document 1795.

FIG. 18 presents a collaboration diagram depicting a method that leverages the legacy login process to enable transition from password-based authentication to authentication by means of digital identities. Presumably, the web service has sufficiently proofed and monitored online usage to believe that passwords have not been compromised.

Scheme 1800 depicts owner 1310 (chris) having personal device 1515 with recently installed identity engine 1530 and digital identity 1813 specified by the owner (chris). Chris routinely uses browser login page 1835 to enter her password to activate by way of 1840, the legacy login mechanism 1845 of web service 1820 employing HTTPS to secure transactions. This service runs on web server 1525 which has an installed identity engine 1830 having digital identity 1814 that was specified by administrator 1810 (alice). After successful password/PIN login, owner 1310 (chris) can use application services 1850.

Chris decides that it is time to transition to using a self-sovereign digital identity to access application services. She starts by selecting "get an identity" on login page 1835 which sends transaction 1855, and is redirected by web service 1820 to identity engine 1830. By way of 1860, identity engine 1830 requests legacy login 1845 to authenticate owner 1310 using standard password authentication. Successful authentication enables identity engine 1830 to conduct a series of transactions 1870 to conduct online identity proofing, attestation, digital sealing, and digital identity exchange between identity engine 1530 of owner 1310 and identity engine 1830 of web service 1820.

After the collaborating parties have successfully proofed, attested and sealed each other's digital identities, owner 1310 (chris) can avoid or even stop using passwords, by selecting "use digital IDs" in login page 1835. This launches transaction 1880 which web service 1820 redirects to identity engine 1830 and launches collaboration with identity engine 1530, using bilateral proof-of-possession, proof-of-custody and other available verification tests to mutually authenticate. Upon successful authentication, her transactions are routed by way of 1890 to application services 1850.

FIG. 19 depicts a protocol for securely exchanging self-sovereign digital identities that adapts the Diffie-Hellman (DH) key exchange method and leverages an HTTPS-enabled identity service. The primary purpose of this adaptation, is to securely exchange digital identities between owners that include claims, attributes, images, attestations, and associated public keys. Recall that every digital identity has three (3) public/private key pairs.

The DH protocol relies on elliptical-curve (EC) public key cryptography to calculate a shared symmetric key that can be used to securely exchange other data between two parties. The parties can generate a suitable secret (private) key which they use as exponents of a large prime number to create each of their public keys. They can safely exchange these public keys, combining them with their private keys to calculate the shared symmetric key.

Referring now to FIG. 19, scheme 1900, collaborating owner 1 1910 and owner 2 1920 have digital identities 1911 and 1921 respectively having identifiers id1 1912 and id2 1922 that are exchanged out of band or are mutually well-known prior to the execution of this protocol. Identity service 1930 uses hashed search keys to locate data when storing and retrieving values such as public encryption keys 1931. Other than unattributed public keys, claims, attributes, images, and other information specifying digital identities are not revealed to the identity service.

During Phase 1:

Owner 1 1910 uses identity engine 1530 to send transaction 1913 containing the hash of id1 1912, plus the three public keys of owner 1's digital identity 1911, namely pubkeys 1, to identity service 1930 which stores pubkeys 1;

Owner 2 1920 uses identity engine 1530 to send transaction 1923 containing the hash of id2 1922, plus the three public keys of owner 2's digital identity 1921, namely pubkeys 2, to identity service 1930 which stores pubkeys 2.

During Phase 2:

Owner 1 1910 uses identity engine 1530 to send transaction 1914 containing the hash of id2 1922, to identity service 1930, which uses the hash to retrieve the three public keys, namely pubkeys 2, of owner 2's digital identity 1921, returning the public keys to owner 1 1910;

Owner 2 1920 uses identity engine 1530 to send transaction 1924 containing the hash of id1 1912, to identity service 1930, which uses the hash to retrieve the three public keys, namely pubkeys 1, of owner 1's digital identity 1911, returning the public keys to owner 2 1920.

During Phase 3:

Owner 1 1910 uses identity engine 1530 to execute the DH (Diffie-Hellman) method 1915 which uses the private keys (privkeys 1) of owner 1 1910 and the retrieved public keys (pubkeys 2) of owner 2 1920 to calculate the shared symmetric keys (symmetrickeys);

Owner 2 1920 uses identity engine 1530 to execute the DH (Diffie-Hellman) method 1925 which uses the private keys (privkeys 2) of owner 2 1920 and the retrieved public keys (pubkeys 1) of owner 1 1910 to calculate the shared symmetric keys (symmetrickeys).

During Phase 4:

Owner 1 1910 uses identity engine 1530 to encrypt the public copy of digital identity 1911 using the calculated shared symmetric keys (symmetrickeys), sending the encrypted digital identity to owner 2 by way of transaction 1916; Owner 2 uses identity engine 1530 to decrypt digital identity 1911 using the calculated shared symmetric keys (symmetrickeys); whereby the digital identity 1911 of owner 1 1910, including specified claims, attributes, images, attestations and public keys, is securely transferred to owner 2 1920;

Owner 2 1920 uses identity engine 1530 to encrypt the public copy of digital identity 1921 using the calculated shared symmetric keys (symmetrickeys), sending the encrypted digital identity to owner 1 by way of transaction 1926; Owner 1 uses identity engine 1530 to decrypt digital identity 1921 using the calculated shared symmetric keys (symmetrickeys); whereby the digital identity 1921 of owner 2 1920, including specified claims, attributes, images, attestations and public keys, is securely transferred to owner 1 1910;

This self-sovereign digital identity exchange protocol is asynchronous, can be repeated, and should be time-limited to mitigate the risk of disclosing private information.

Because digital identities have three public/private key pairs, the DH method can be adapted to calculate one, two, or three symmetric keys. Depending on situational risks and performance constraints (if any), single, double and triple symmetric key encryption can be applied to secure the transfer and exchange of digital identities.

OpenID Connect offers a consent model whereby identity and access tokens are provisioned by web identity providers using password-based authentication. More particularly, access tokens authorizing access to users' resources stored in the cloud are handled by service providers coordinating with web services controlling access to these resources. This server centric approach to delegating consent is problematic given the massive volume of private and personally identifying captured across the web, escalating concerns about hacking, breaches, and increasing vulnerability due to enormous web-based complexity, and the lack of server-side transparency and accountability into how personal information of citizens, consumers and employees is being used.

In contrast, the self-sovereign identity architecture enables owners to strongly and reliably control access to their web-based resources. It includes a model for specifying self-sovereign consent tokens shown in FIG. 20. Scheme 2000 depicts resource owner 2010 (chris) with personal device 1515, custodian service 2020 containing certain resources 2025 of chris, and relying party 2030 (karl) who has requested access to chris' resources which she is ready to provide. Chris, karl and the custodian service have installed identity engines 1530, each containing at least one of their digital identities 1813, 1814, and 2031.

FIG. 20 provides a data model for depicted consent tokens 2001 with fields in the token identifying the resource owner, the custodian service holding the owners' resources, the relying party seeking to access resources, permissions to access the resources, and the expiry date/time for the consent token. Valid access permissions may include read, write, append, delete and other such privileged operations. To simplify the presentation, illustrative resource names and identifiers are not depicted.

However, digital seals are depicted representing cryptographic identity bindings of stakeholders. In the current context, the digital identities of chris, karl and the custodian service have relevancy. Not shown is the ability of digital identity owners such as chris, karl and the custodian, to register and verify consent tokens by way of an identity registry.

FIG. 20 depicts relying party 2030 (karl) who has requested access to selected resources of owner 2010. In response, resource owner 2010 (chris) specifies a consent token listing pertinent resources of chris. 2050 illustrates owner 2010 (chris) sending a request to custodian 2020 who employs his digital identity 1530 to digitally seal the consent token. The presence of the seal binding the resource holder to the consent token confirms that custodian 2020 is prepared to honor the permissions expressed in the consent token.

Also depicted is a request 2051 from owner 2010 (chris) to relying party 2030 (karl) who accepts, digitally seals, and returns 2052 the expressed permissions to owner 2010 (chris). Next, owner 2010 (chris) attests and digitally seals the token 2053, sending it to relying party 2030 (karl). Relying party 2030 (karl) verifies the affixed digital seals and attestations sending an access request and the consent token 2054 to custodian 2020 who verifies 2055 the affixed digital seals, and honors the accepted access permissions up to the expiry date and time of the token.

To facilitate adoption and usability, digital identities are virtualized and handled in a manner that is consistent with identity processes used in the physical world. Encapsulated authentication data (e.g. PINs, biometrics) enable owners to tightly control their secrets and digital identities as well as the acquired public copies of digital identities belonging to other parties. Employing a common data model with integrated public/private keys for structuring digital identities enables persistence and portability. The identity layer supports interoperability with applications and the identity registry, and secures transactions between collaborating parties Because public/private keys are integral to every digital identity created, owners cannot repudiate having taken critical actions. For example, when presenting, attesting, or registering digital identities, owners cannot deny having done so, thereby providing elevated identity assurances to relying parties. Digital identities can be reliably verified because the private keys of owners' digital identities are not revealed. A relying party can thwart impersonation attempts by obtaining proof-of-possession and proof-of-custody from originators or by verifying digital identities in the proof-of-existence identity registry. To create bogus identities the hacker is obliged to successfully break into the personal devices, identity engines, and private keys of owners, one device at a time, a prohibitive task.

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein.

All patent and non-patent literature cited herein is hereby incorporated by references in its entirety for all purposes.

The invention claimed is:

1. A method for synchronously verifying digital identities comprising:
   providing personal devices of owners, each device having an identity engine, the identity engine of a first owner having the sovereign image of a digital identity of the first owner including public and private keys of said digital identity, the first owner having presented to a second owner a public copy of said digital identity including public keys of said digital identity and an affixed digital signature calculated over said digital identity and public keys using the private signing key of said digital identity, the identity engine of the second owner having received the public copy of said digital identity including public keys and digital signature;
   the identity engine of the second owner using the public verification key of said digital identity to verify the affixed digital signature;
   if successfully verified, the identity engine of the second owner creating a random challenge, using the public encryption key of said digital identity yielding an encrypted challenge, sending the encrypted challenge to the identity engine of the first owner, the identity engine of the first owner using the private decryption key of said digital identity to decrypt the challenge, sending the decrypted challenge to the second owner, the identity engine of the second owner matching the decrypted challenge to the random challenge, the first owner providing proof-of-possession of the private decryption key and the digital identity of the first owner to the second owner if the decrypted challenge matches the random challenge;
   if the match is successful, the identity engine of the second owner sending a demand to the identity engine of the first owner to authenticate said owner, said identity engine sending a proof-of-custody acknowledgement to the identity engine of the second owner if the first owner is successfully authenticated;
   whereby the identity engine of the second owner acquires proof that the identity engine of the first owner possesses the presented digital identity, and that the first owner has custody of the originating personal device, thereby providing objective evidence that the first owner controls the presented digital identity.

2. A method for securely exchanging self-sovereign digital identities comprising:

providing personal devices of owners, said devices having an identity engine, the identity engine of an owner having digital identities of the owner;

providing an identity service having a memory, said identity service capable of storing public encryption keys into said memory at a memory location determined from a hash provided by the identity engine of an owner;

said identity service further capable of retrieving public encryption keys stored in said memory at a memory location determined from a hash provided by the identity engine of an owner;

the identity engine of the first device owner transferring the identifier of a selected digital identity of the first owner, the identifier of the first owner, to the identity engine of the second device owner; and the identity engine of the second device owner transferring the identifier of a selected digital identity of the second owner, the identifier of the second owner, to the identity engine of the first device owner;

the identity engine of the first owner calculating the hash of the identifier of the first owner, sending said hash and the public keys of the selected digital identity of the first owner to the identity service, said identity service storing said public keys in a memory location determined from said hash by the identity service;

and the identity engine of the second owner calculating the hash of the identifier of the second owner, sending said hash and the public keys of the selected digital identity of the second owner to the identity service, said identity service storing said public keys in a memory location determined from said hash by the identity service;

the identity engine of the first owner calculating the hash of the identifier of the second owner, sending said hash to the identity service, the identity service retrieving public keys from a memory location determined from said hash by the identity service, and transferring said public keys, the public keys of the second owner, to the identity engine of the first owner;

and the identity engine of the second owner calculating the hash of the identifier of the first owner, sending said hash to the identity service, the identity service retrieving public keys from a memory location determined from said hash by the identity service, and transferring said public keys, the public keys of the first owner, to the identity engine of the second owner;

the identity engine of the first owner using the Diffie-Hellman method to calculate shared symmetric keys by combining the retrieved public keys of the second owner with the private keys of the selected digital identity of the first owner;

and the identity engine of the second owner using the Diffie-Hellman method to calculate shared symmetric keys by combining the retrieved public keys of the first owner with the private keys of the selected digital identity of the second owner;

the identity engine of the first owner using the shared symmetric keys to encrypt the selected digital identity of the first owner including public keys, sending the encrypted digital identity to the second owner, the second owner receiving and decrypting said digital identity of the first owner;

the identity engine of the second owner using the shared symmetric keys to encrypt the selected digital identity of the second owner including public keys, sending the encrypted digital identity to the first owner, the first owner receiving and decrypting said digital identity of the second owner;

whereby the first owner and the second owner exchange selected digital identities, including specified claims, attributes, images and public keys, without disclosing the paired private keys.

3. A method for using consent tokens to reliably grant access to resources the owner comprising:

providing personal devices of owners, said devices having an identity engine, the identity engines of owners having at least one digital identity of the owner, including the sovereign image, and the public copy of digital identities acquired from collaborating owners, a resource owner having resources managed by a custodian service, the custodian service having authority to manage access to the resources of the resource owner, a relying party requesting access to the resources of the resource owner, and a consent data model enabling a resource owner to create a consent token identifying at least the resource owner, the custodian service, the relying party, selected resources of the resource owner, permissions granted by the resource owner to the relying party to access the selected resources, and the expiry data and time of the consent token;

the resource owner using the identity engine of the resource owner to create a consent token, specifying the resource owner, the custodian service, the relying party, selected resources of the resource owner managed by the custodian service, permissions granted to the relying party to access the selected resources, and the expiry date and time of the consent token;

the identity engine of the resource owner sending the consent token to the identity engine of the custodian service, the custodian service specifying an attestation agreeing to the permissions specified by the consent token, and the identity engine of the custodian service using the private embossing key of the digital identity of the custodian service to create a digital seal affixing the identity and attestation of the custodian service to the consent token, and returning said attested and sealed consent token to the identity engine of the resource owner;

the identity engine of the resource owner sending the consent token to the identity engine of the relying party, the relying party specifying an attestation agreeing to the permissions specified by the consent token, and the identity engine of the relying party using the private embossing key of the digital identity of the relying party to create a digital seal affixing the identity and attestation of the relying party to the consent token, returning said attested and sealed consent token to the identity engine of the resource owner;

the resource owner using the public inspection key of the digital identity of the custodian service to verify the attestation and digital seal affixed by the custodian service to the consent token;

the resource owner using the public inspection key of the digital identity of the relying party to verify the attestation and digital seal affixed by the relying party to the consent token;

the resource owner sending the consent token to the relying party if said verifications are both successful;

the relying party sending the consent token to the custodian service, the identity engine of the custodian service using the public inspection key of the digital identity of the relying party to verify the attestation and digital seal affixed to the consent token by the relying party, the identity engine of the custodian service using the public inspection key of the digital identity of the resource owner to verify the attestation and digital seal affixed to the consent token by the resource owner, the identity engine of the custodian service using the public inspection key of the digital identity of the custodian service to verify the attestation and digital seal affixed to the consent token by the custodian service, the custodian service granting access to the resources of the resource owner if said verifications are successful;

whereby the relying party is granted access to the resources of the owner managed by the custodian service.

\* \* \* \* \*